United States Patent
Kujawski, Jr. et al.

(10) Patent No.: US 11,529,722 B2
(45) Date of Patent: Dec. 20, 2022

(54) FLUID CONNECTOR WITH FULL INSERTION ASSURANCE CAP DISCONNECT TOOL

(71) Applicant: Oetiker NY, Inc., Lancaster, NY (US)

(72) Inventors: James Anthony Kujawski, Jr., Attica, NY (US); Bradley Chester Fremont, Lancaster, NY (US); Kip Steveley, Lancaster, NY (US)

(73) Assignee: Oetiker NY, Inc., Lancaster, NY (US)

( * ) Notice: Subject to any disclaimer, the term of this patent is extended or adjusted under 35 U.S.C. 154(b) by 423 days.

(21) Appl. No.: 16/814,111

(22) Filed: Mar. 10, 2020

(65) Prior Publication Data

US 2020/0208594 A1 Jul. 2, 2020

Related U.S. Application Data

(60) Division of application No. 15/396,974, filed on Jan. 3, 2017, now abandoned, which is a
(Continued)

(51) Int. Cl.
*F16L 37/091* (2006.01)
*B25B 27/00* (2006.01)
(Continued)

(52) U.S. Cl.
CPC ... *B25B 27/0028* (2013.01); *F02M 35/10091* (2013.01); *F16L 37/0885* (2019.08);
(Continued)

(58) Field of Classification Search
CPC .............. B25B 27/0028; F16L 37/0915; F16L 37/091; F16L 37/0885; F16L 37/1225; F16L 37/144; F16L 2201/10
See application file for complete search history.

(56) References Cited

U.S. PATENT DOCUMENTS

| 1,200,266 A | * | 10/1916 | Strausser | .............. F16L 37/252 |
| | | | | 285/308 |
| 2,225,208 A | | 12/1940 | Crickmer | |

(Continued)

FOREIGN PATENT DOCUMENTS

| EP | 1258666 | 11/2002 | | |
| WO | WO-9703314 A1 | * | 1/1997 | .......... F16L 37/0915 |

*Primary Examiner* — Zachary T Dragicevich
*Assistant Examiner* — James A Linford
(74) *Attorney, Agent, or Firm* — Harter Secrest & Emery LLP; Michael Nicholas Vranjes

(57) ABSTRACT

A fluid connector, including a tubular member, a connector body, including an exterior opening groove, and a retainer clip to lock the tubular member to the connector body, an assurance cap including one or more latch fingers engaged with the exterior opening groove, and a tool, including an annular collar mountable over the tubular member, and a plurality of fingers carried on and extending axially from the annular collar, the plurality of fingers operatively arranged to engage the latch fingers when the collar and the plurality of fingers are engaged with the assurance cap to disengage the latch fingers from the exterior opening groove to disconnect the assurance cap from the connector body.

20 Claims, 28 Drawing Sheets

Related U.S. Application Data continuation-in-part of application No. 14/725,639, filed on May 29, 2015, now Pat. No. 10,422,460.

(60) Provisional application No. 62/005,136, filed on May 30, 2014.

(51) Int. Cl.
  *F16L 37/088* (2006.01)
  *F02M 35/10* (2006.01)
  *F16L 37/12* (2006.01)

(52) U.S. Cl.
  CPC ......... *F16L 37/091* (2013.01); *F16L 37/0915* (2016.05); *F16L 37/1225* (2013.01); *F16L 2201/10* (2013.01)

(56) References Cited

U.S. PATENT DOCUMENTS

| | | |
|---|---|---|
| 2,377,812 A | 6/1945 | Scheiwer |
| 3,245,423 A | 4/1966 | Hansen et al. |
| 3,532,101 A | 10/1970 | Snyder, Jr. |
| 5,318,332 A | 6/1994 | Hohmann et al. |
| 5,452,924 A | 9/1995 | Kujawski |
| 5,630,570 A | 5/1997 | Lacroix et al. |
| 5,685,052 A | 11/1997 | Meyers et al. |
| 5,725,257 A * | 3/1998 | Sakane ............... F16L 37/0885 285/86 |
| 5,749,606 A | 5/1998 | Lu et al. |
| 5,758,682 A | 6/1998 | Cain |
| 5,816,298 A | 10/1998 | Stricklin et al. |
| 5,909,901 A | 6/1999 | Zillig et al. |
| 7,195,228 B2 | 3/2007 | Tiberghien et al. |
| 7,458,392 B2 | 12/2008 | Cornwell |
| 8,267,376 B2 | 9/2012 | Stoll et al. |
| 8,322,941 B2 | 12/2012 | Cermak |
| 2002/0070549 A1 * | 6/2002 | Romero ............... F16L 37/0987 285/305 |
| 2003/0001384 A1 | 1/2003 | Carroll |
| 2005/0087245 A1 | 4/2005 | Magnus et al. |
| 2010/0224258 A1 | 9/2010 | Steveley et al. |
| 2013/0037141 A1 | 2/2013 | Kujawski, Jr. et al. |
| 2015/0159792 A1 * | 6/2015 | Bobo ................ F16L 37/0915 285/308 |

* cited by examiner

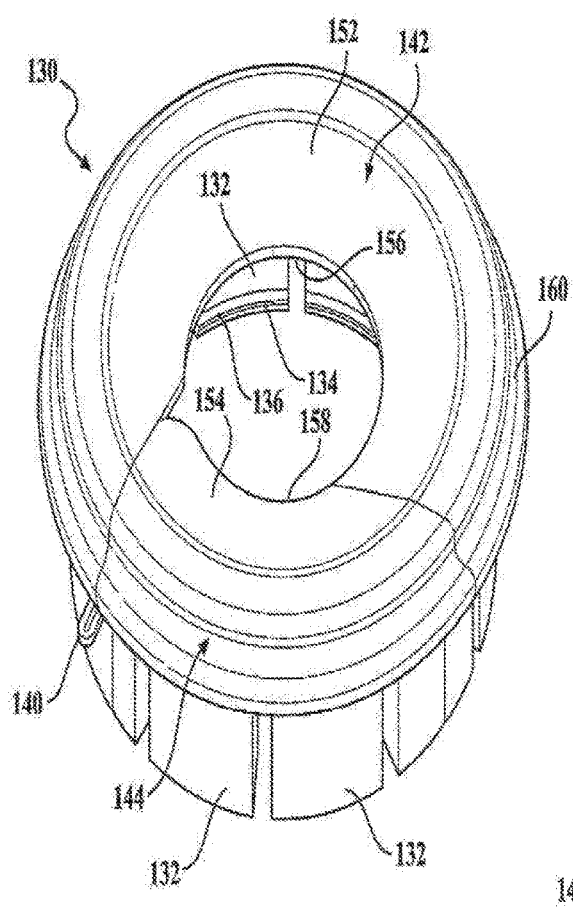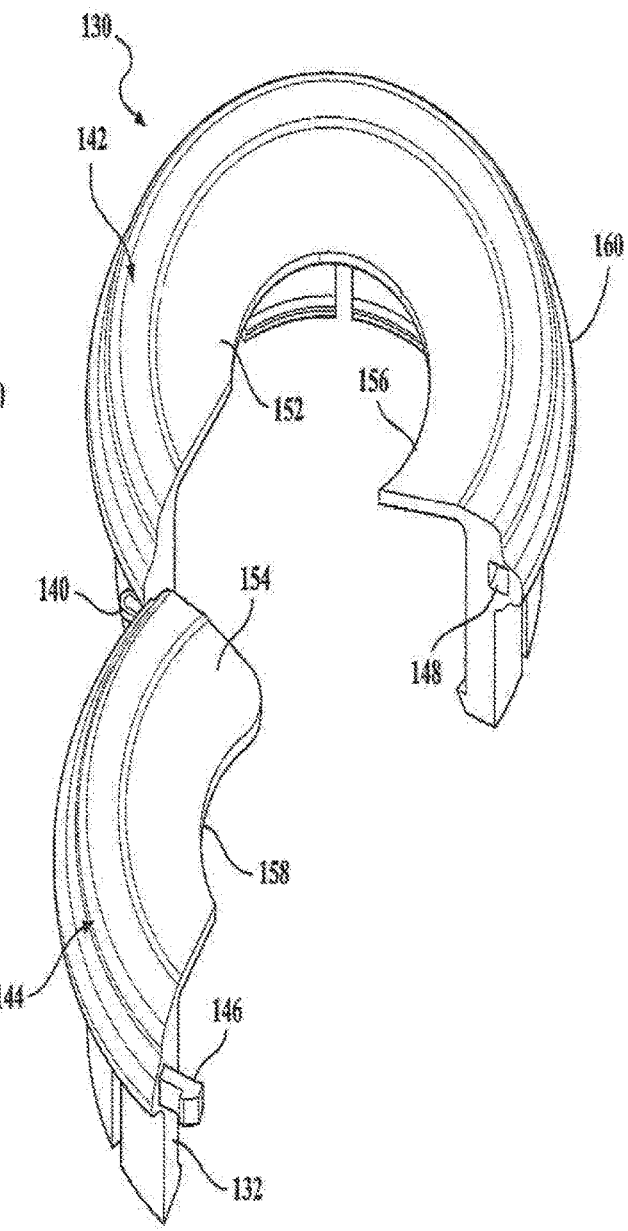
FIG. 16A
FIG. 16B

FLUID CONNECTOR WITH FULL INSERTION ASSURANCE CAP DISCONNECT TOOL

CROSS-REFERENCE TO RELATED APPLICATIONS

This application is a divisional of co-pending U.S. patent application Ser. No. 15/396,974, filed Jan. 3, 2017, which application is a continuation-in-part of U.S. patent application Ser. No. 14/725,639, filed May 29, 2015, now U.S. Pat. No. 10,422,460, which claims priority benefit to U.S. Provisional Patent Application No. 62/005,136, filed May 30, 2014, which applications are incorporated herein by reference in their entireties.

FIELD

The present apparatus relates to fluid connectors including a fluid carrying tubular member which is coupled to a fitting body connected to a device which uses the fluid. In an automotive application, the fluid carrying components are connected at one end to an automatic transmission and at another end to a cooler disposed within a vehicle radiator. Other automotive applications using fluid connectors include turbo connections.

BACKGROUND

"Quick connectors" typically include a resilient clip carried on the fitting body which is adapted to snap behind a raised shoulder of an end form on the tubular member when the tubular member is fully inserted into the fitting body to lock the tubular member in place.

Assurance caps can be used to insure full insertion of the tubular member in the body. An assurance cap is carried by the tubular member and slides over the tubular member insertion end of the body and snaps over the outer edges of the resilient clip. If the tubular member is not fully inserted in the body such that the resilient clip is not seated behind the raised shoulder on the tubular member, raised portions of the resilient clip extend further radially outward from the body and interfere with the complete movement of the assurance cap to its fully installed position thereby providing an indication to the installer that the tubular member is not fully latched in the body.

Although assurance caps can be easily moved to the full insertion position, such assurance caps can difficult to remove in order to disconnect the fluid coupling for repairs or placement of components. Aside from physically breaking or cutting the assurance cap latches it has proven difficult to remove the assurance cap from a fluid connector without damage to the assurance cap.

Disconnect tools have been employed to disengage the retainer clip of such fluid connectors from the connector body in order to separate the tubular member from the connector. U.S. Pat. No. 5,909,901 discloses a disconnect tool having a plurality of fingers which, when the assurance cap, which has been previously mounted over the tubular member, is moved into engagement with the connector body and rotated expand the protrusions on the retainer clip outward a sufficient distance to enable the endform of the tubular member to be separated from the connector body.

SUMMARY

According to aspects illustrated herein, there is provided a fluid connector, comprising a tubular member, a connector body, including an exterior opening groove, and a retainer clip to lock the tubular member to the connector body, an assurance cap including one or more latch fingers engaged with the exterior opening groove, and a tool, including an annular collar mountable over the tubular member, and a plurality of fingers carried on and extending axially from the annular collar, the plurality of fingers operatively arranged to engage the latch fingers when the collar and the plurality of fingers are engaged with the assurance cap to disengage the latch fingers from the exterior opening groove to disconnect the assurance cap from the connector body.

According to aspects illustrated herein, there is provided a fluid connector assembly, comprising a tubular member, a connector body, including an exterior opening groove, and a retainer clip to lock the tubular member to the connector body, an assurance cap including one or more latch fingers engaged with the exterior opening groove, and a tool, including an annular collar mountable over the tubular member, the annular collar comprising a first end surface and a second end surface, and a plurality of fingers extending from the second end surface.

According to aspects illustrated herein, there is provided a fluid connector assembly, comprising a connector body, including an exterior opening groove, a tubular member operatively arranged to be connected to the connector body, an assurance cap including one or more latch fingers engaged with the exterior opening groove when the tubular member is connected to the connector body, and a tool including a plurality of fingers operatively arranged to engage the one or more latch fingers to disengage the one or more latch fingers from the exterior opening.

The present disclosure broadly discloses a disconnect tool for a fluid connector carrying a retainer clip to lock a tubular member to the connector body, and an assurance cap with latch fingers having projections engageable with an exterior opening groove in the connector body to lock the assurance cap to the connector body. The disconnect tool has an annular collar mountable over the tubular member. A plurality of fingers are carried on and extend in one direction from the annular collar. The plurality of fingers are positioned to engage the latch fingers on the assurance cap when the plurality of fingers are engaged with the latch fingers to disengage the projections on the latch fingers from the exterior groove in the connector body to enable the assurance cap to be separated from the connector body.

A grip surface can be formed on an outer circumferential edge of the collar to facilitate gripping of the collar.

An end of each of the plurality of fingers is engageable with a ramp surface on the connector body when the collar and the plurality of fingers are urged into engagement with the connector body through the assurance cap to flex the latch fingers outward relative to the connector body.

The present disclosure also broadly discloses a method for disconnecting an assurance cap from a fluid connector body, where the fluid connector body has a retainer clip for locking a tubular member to the body and the assurance cap has latch fingers with projections engageable with an exterior opening groove in the connector body to lock the assurance cap to the fitting connector body. The method includes providing a disconnect tool having an annular collar and a plurality of circumferential spaced fingers extending in one direction from the collar, positioning the disconnect tool over the tubular member, sliding the disconnect tool longitudinally along the tubular member to urge the fingers on the disconnect tool through apertures in the assurance cap to bring the fingers into engagement with the primary latch fingers of the assurance cap, and continuing insertion of the fingers on the collar in a direction to flex and separate the primary latch fingers from the exterior opening groove in the fitting body.

The method can also include flexing the ends of the fingers as the fingers are slid through the assurance cap radially outward relative to the connector body through engagement with a ramp surface on the connector body.

In one aspect, a fluid connector assembly includes a tubular member having an endform spaced from a first insertion end defining a radially disposed shoulder, a connector body having a bore with an open end receiving the tubular member, a retainer clip carried on the connector body and extending partially into the bore to engage the shoulder of the tubular member to lock the tubular member in the connector body when an first insertion end of the tubular member is fully inserted into the bore in the connector body. The assurance cap is slidably mounted relative to the tubular member. The assurance cap defines a body having a plurality of primary latch fingers with end projections configured for latching in a recessed exterior opening groove in the connector body to latch the assurance cap on the connector body only when the tubular member is fully inserted into the connector body. Each of the primary latches is formed of first and second spaced side legs joined at one end by a center end leg. The end projection of each plurality of primary latch fingers is carried on the center end leg. A secondary latch can be carried on the assurance cap body for engaging one of the retainer clip and the tubular member to secondarily latch the assurance cap to the tubular member only when the tubular member is fully inserted into the bore in the connector body.

The primary latch fingers may include a plurality of circumferentially spaced primary latch fingers extending from a first end of the assurance cap body.

A radially inward projection can be formed on a flexible end of the primary latch fingers. A radially outward exterior opening groove can be formed in the connector body, spaced from the one end of the connector body. The groove and the projections on the primary latch fingers are engageable to primarily latch the assurance cap to the connector body only when the tubular member is fully inserted into the bore in the connector body.

An inner support ring is fixed in the assurance cap body radially inward of the primary latch fingers. The inner support ring has a through bore through which the tubular member extends and an inner end positioned to engage a surface on the tubular member to provide a secondary latch between the assurance cap body and the tubular member when the tubular member is fully inserted into the bore in the connector body.

The surface on the tubular member is axially spaced from the endform and defines a raised surface on the tubular member.

The through bore in the inner support web has a keyhole shape to facilitate mounting of the assurance cap over the endform on the tubular member.

One or a plurality of stepped fingers can be circumferentially spaced between the primary latch fingers. Each of the stepped fingers has an inner surface with at least one step configured to overlay a radially outward portion of the retainer clip when the assurance cap is latched to the body of the quick connector and the tubular member to resist radially outward expansion of the retainer clip and act as a secondary latch of the assurance cap to the connector body.

The primary latch fingers can include a plurality of circumferentially spaced primary latch fingers extending from a first end of the assurance cap body, with one stepped finger disposed circumferentially intermediate two primary latch fingers.

BRIEF DESCRIPTION OF THE DRAWINGS

The various features, advantages and other uses of the present fluid connector with full insertion assurance cap disconnect tool will become more apparent by referring to the following description and drawings in which:

FIG. 16A is a perspective view of another aspect of an assurance cap;

FIG. 16B is a partially opened, perspective view of the assurance cap shown in FIG. 16A;

DETAILED DESCRIPTION

Figure 1:
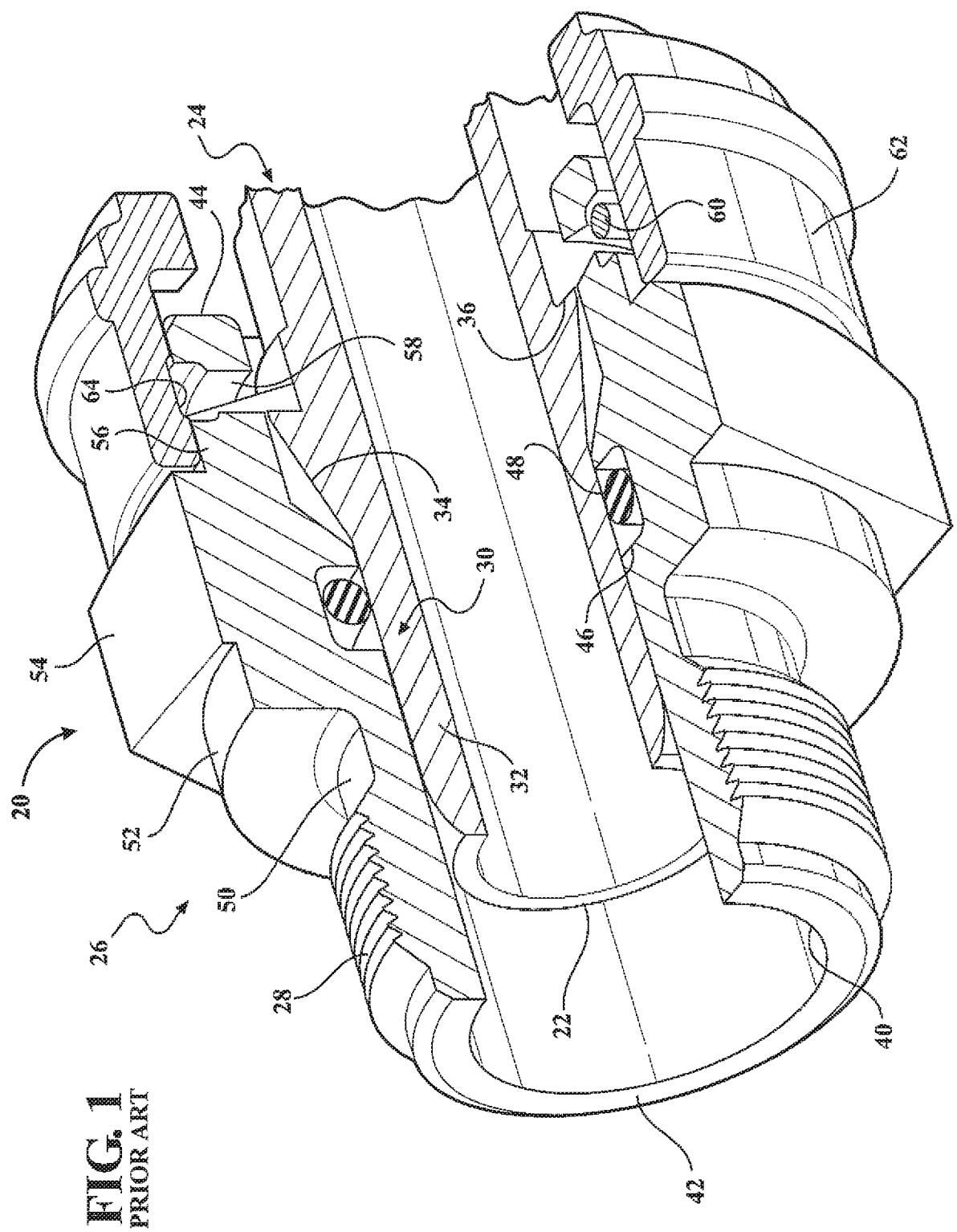
FIG. 1 is a cross-sectioned perspective view of a prior art fluid quick connector with assurance cap.
Figure 2:
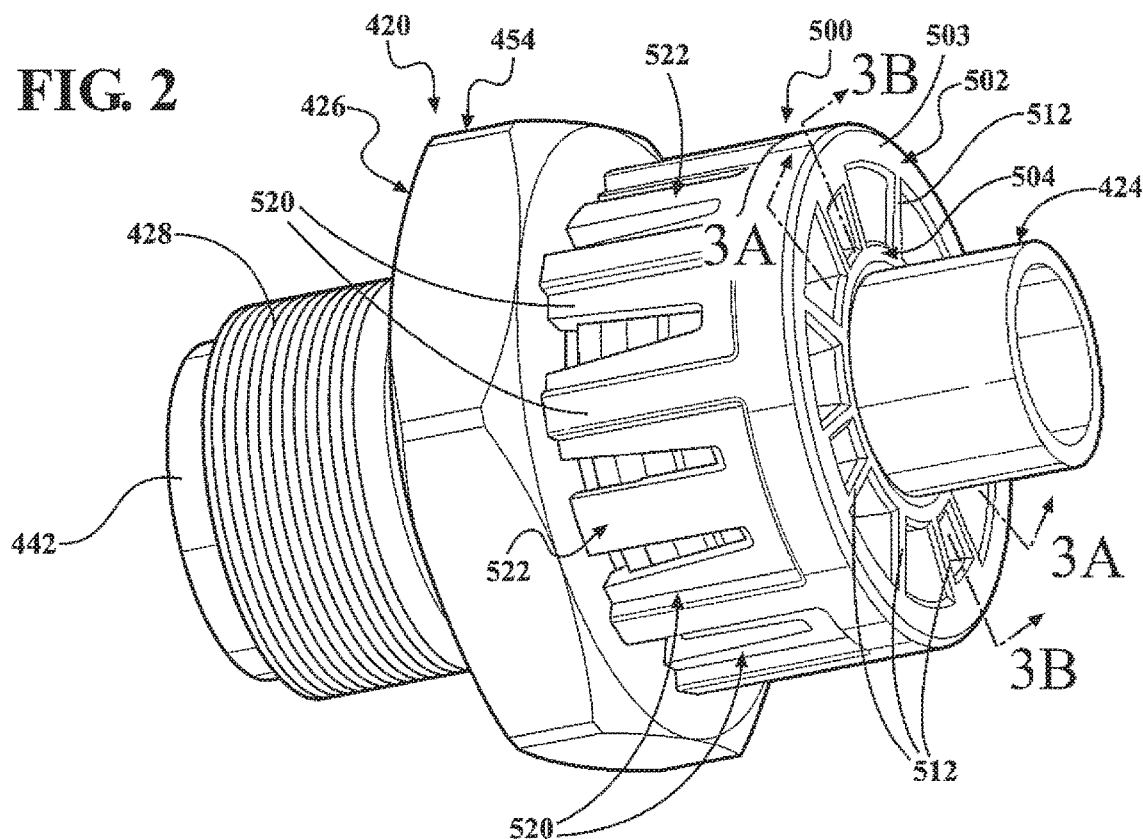
FIG. 2 is a perspective view of an assembled quick connector and assurance cap described herein.

Referring now to FIG. 1, there is depicted prior art fluid connector assembly 20 which locks first end 22 of tubular member 24 in connector or fitting body 26 which is itself removably mountable in a port, such as by engagement of external threads 28 on one end of body 26 with internal threads in the port.

Tubular member 24 is generally made of metallic materials, but rigid plastic material may also be employed. Tubular member 24 has a generally constant diameter extending from first end 22.

Head section 30 extends from first end 22 at first diameter portion 32 to an outward extending endform having a tapered raised surface 34 which terminates at a large diameter end and radially extending shoulder 36.

Connector body 26 can be, but need not necessarily be, integrally made from a single piece of metallic or plastic material. Body 26 has through bore 40 extending from first end 42 to opposite second end 44. Bore 40 need not have a constant diameter between first and second ends 42 and 44. Annular internal groove 46 is formed in body 26 intermediate first and second ends 42 and 44 and receives seal member 48, such as an O-ring, for sealing tubular member 24 to body 26 and to prevent fluid leakage therebetween.

As described above, body 26 has an externally threaded end portion 28 spaced from first end 42. A recessed radially inward extending groove 50 can be formed in certain applications adjacent one end of threaded end portion 28 and annular collar 52 to receive a washer, not shown. A hexagonal portion 54 is formed adjacent annular collar 52. A reduced diameter receiving portion 56 having a generally constant diameter extends from one end of hexagonal portion 54 to second end 44 of body 26. A recessed, outward opening, annular groove 58 is formed in receiving portion 56. Groove 58 has a constant closed inner end facing bore 40 in body 26 which is interrupted by one or more circumferentially spaced slots.

Retainer clip 60 is mounted in groove 58. Retainer clip 60 can be, but need not necessarily be formed of a spring wire. Retainer clip 60 can be formed with inwardly extending protrusions which project through the slots in groove 58, when retainer clip 60 is in a relaxed state behind shoulder 36 on tubular member 24, to lock tubular member 24 to connector body 26.

When first end 22 of tubular member 24 is inserted to receiving end 56 of body 26, first end 22 and head section 30 of tubular member 24 slides through receiving portion 56 toward first end 42 of body 26. Inward extending protrusions on retainer clip 60 seated in groove 58 slide along endform tapered surface 34 on tubular member 24 causing retainer clip 60 to expand radially outward moving protrusions on retainer clip 60 out of bore 40 until shoulder 36 of tubular member 24 slides past one end of retainer clip 60. At this point, protrusions on retainer clip 60 snap radially inward into bore 40 behind shoulder 36 locking tubular member 24 in body 26. Also, at this point during the insertion process, outermost portions of retainer clip 60 extend only slightly above the outer surface of receiving end 56 of body 26.

A prior art assurance cap 62 shown in FIG. 1, carried on tubular member 24, can then be slid over receiving portion 56 of body 26. Assurance cap 62 includes inward opening recess 64 which is positioned between the ends of assurance cap 62 to encompass the outer portions of retainer clip 60 extending outward from body 26 when retainer clip 60 is in the fully seated position in groove 58 behind shoulder 36 of tubular member 24. This provides the installer with a visual indication that tubular member 24 is fully inserted and seated in body 26 in a fluid sealed position.

In the event that tubular member 24 is not fully inserted into body 26 such that it is not in the position shown in FIG. 1, the outer portions of clip 60 will have been pushed radially outward into a radially expanded state as clip 60 rides up along endform tapered surface 34 of tubular member 24. Outer tips of the outer portions of retainer clip 60 then extend further outward beyond the outer surface of receiving portion 56 of body 26 in an interference position with the sliding movement of assurance cap 62. This interference prevents assurance cap 62 from being slid fully forward such that recess 64 cannot snap over clip 60. Since assurance cap 62 is therefore not in a fully forward position, the installer has a visual indication that tubular member 24 is not fully inserted into body 26.

FIGS. 2-8 depict alternate assurance cap 500 mounted on fluid connector assembly 420. Fluid connector assembly 420 locks one end 422 of fluid flow tubular member or conduit 424 (hereafter "tubular member 424" at first) in connector body 426 which is itself removably mountable in a port, such as by engagement of external thread 428 on one end of body 426 with internal threads in the port of an external device, connector, housing, etc.

Tubular member 424 has a generally constant diameter extending from first end 422. Head section 430 extends from first end 422 at first diameter 432 to an outward extending endform having a tapered radially outward extending ramp surface 434 which terminates in a large diameter end and radially extending shoulder 436. Raised bead or collar 437 is formed on the exterior surface of tubular member 424 and extends axially from shoulder 436 for a short distance to end or shoulder 438 which transitions to the constant first diameter of overall tubular member 424.

Connector body 426 has through bore 440 extending from first end 442 to opposite second end 444. Bore 440 may or may not have a constant diameter between first and second ends 442 and 444. Annular internal groove 446 is formed in connector body 426 intermediate first and second ends 442 and 444 and receives seal member, such as an O-ring 448, for sealing tubular member 424 to connector body 426 and to prevent fluid leakage therebetween.

Connector body 426 has an external threaded end portion 428 spaced from first end 442. A radially inward extending groove 450 can be formed adjacent one end of threaded end portion 428 for receiving external seal member 451, such as an O-ring, for sealing connector body 426 to the external component. Hexagonal portion 454 is formed adjacent to recess 450.

Annular recess or groove 476 of a first diameter extends axially from one edge of hexagonal portion 454. Recess 476 terminates in a radially outward extending shoulder at one end of annular ring 470. Annular ring 470 transitions into a radially inward extending ramp or conical surface 472 which transitions into axially extending surface 466 having an outer diameter larger than the inner diameter of recess 476. Axial surface 476 transitions into recess or groove 468. Groove 468 includes a plurality of circumferentially spaced apertures 469, with three apertures being employed, for example, for three-protrusion retainer clip 460. Recess 468 transitions into larger diameter end annular ring 464 which extends to second end 444 of body 426.

Resilient retainer clip 460 ("clip 460") mounted in groove 468 can be, but need not necessarily be formed of a single piece of spring wire. Clip 460 can be formed with a plurality of radially inward extending protrusions which project through slots or apertures 469 in groove 458 when clip 460 is in a relaxed state behind shoulder 436 on tubular member 424 to lock tubular member 424 to connector body 426. At the same time, clip 460 can be in a relaxed state prior to insertion of tubular member 424 into open insertion second end 444 of connector body 426.

When first end 422 of tubular member 424 is inserted into open second end 444 of connector body 426, first end 422 and head section 430 of tubular member 424 slide through the aperture in bore 440 at second end 442 of connector body 426 toward first end 442 of connector body 426. Inwardly extending protrusions on clip 460 slide along tapered endform ramp surface 434 endform on tubular member 424 causing clip 460 to expand radially outward moving protrusions on resilient clip 460 out of groove 468 until shoulder 436 on the end of outward tapered endform ramp portion 434 of tubular member 424 slide past one end of clip 460. At this point, protrusions on clip 460 snap radially inward into bore 440 in connector body 426 behind shoulder 436 locking tubular member 424 in connector body 426.

As shown in FIGS. 2-8, assurance cap 500 is in the form of a one-piece body, which may be molded, machined or otherwise formed out of plastic, metal, such as aluminum, etc.

Assurance cap 500 is formed with first outer annular ring 502 at first end 503. Inner support ring 504, generally in the form of a cylindrical annular member, has first end 506 generally disposed coplanar with first end 503 of first annular outer ring 502, and second opposed end 508 spaced a distance by a tubular wall of inner support ring 504 from first end 506 of inner support ring 504. Inner support ring 504 has a hollow interior defining through bore 510 extending between first and second ends 506 and 508.

Figure 5:
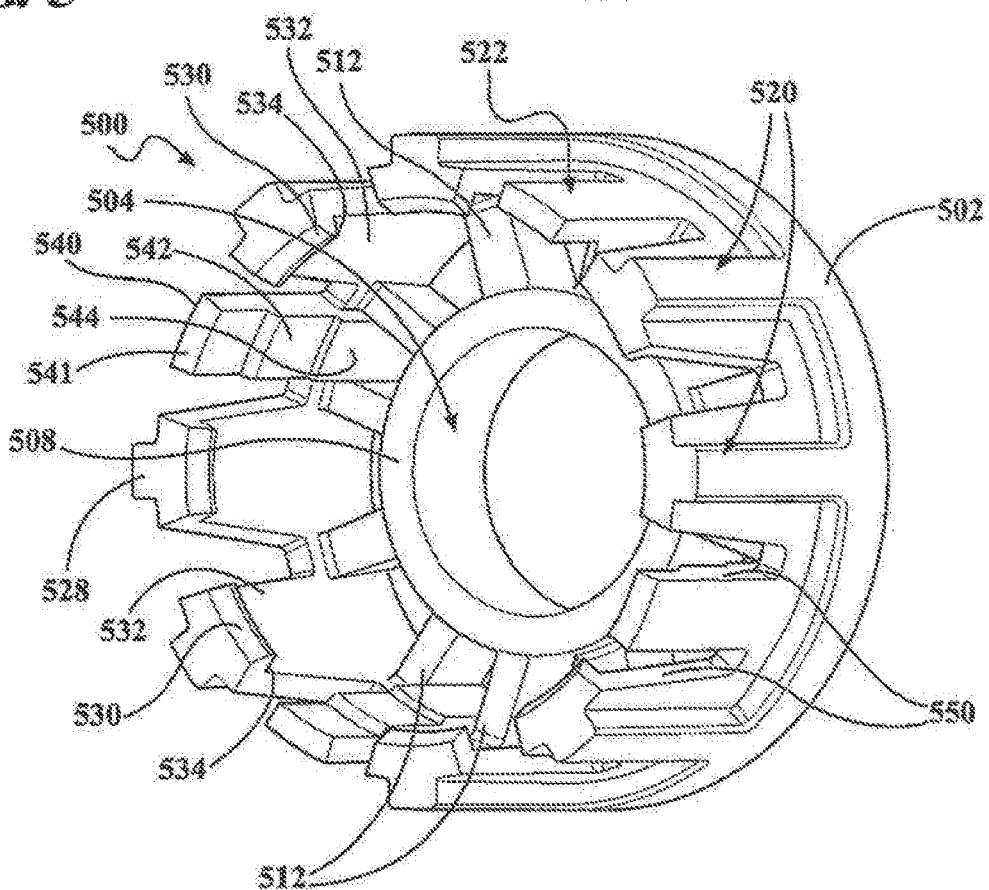
FIG. 5 is a perspective view from the opposite end of the assurance cap shown in FIG. 4.
Figure 6:
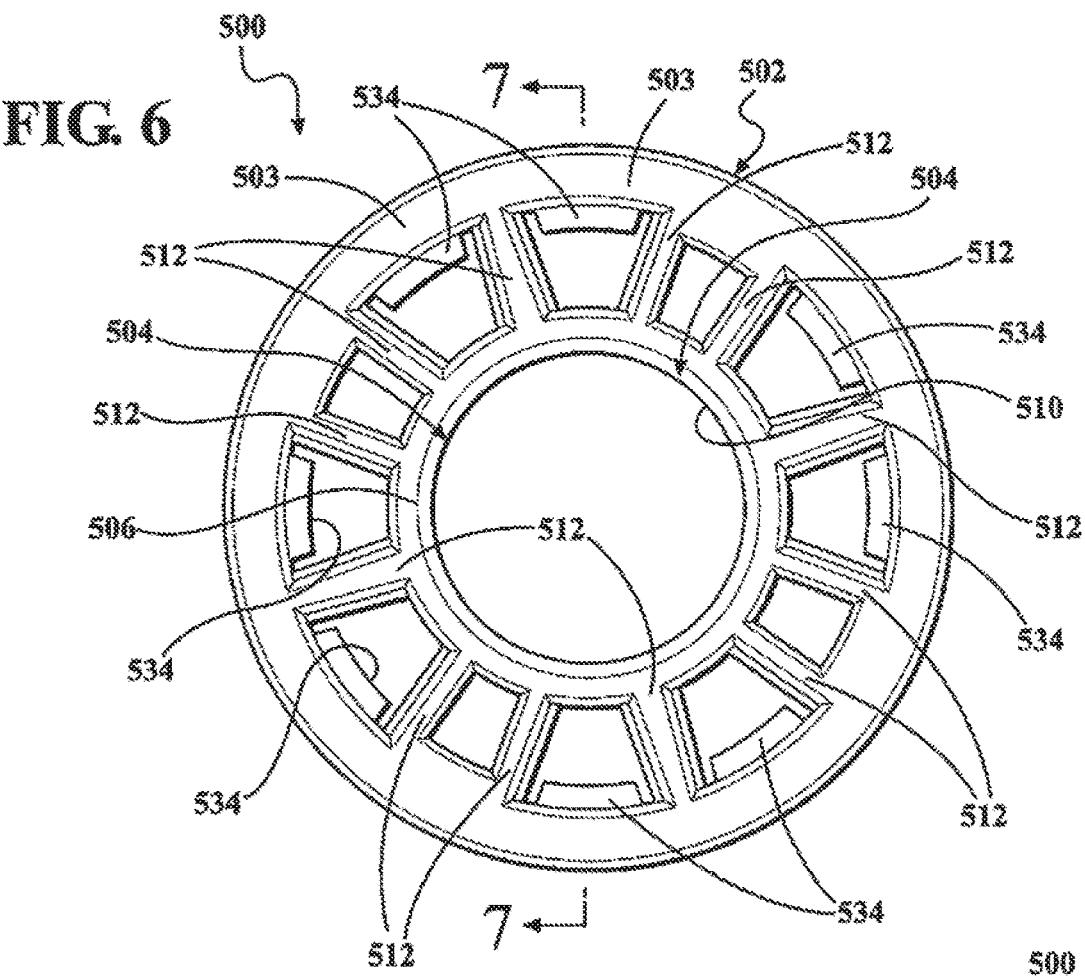
FIG. 6 is an end view of the assurance cap shown in FIG. 4.
Figure 7:
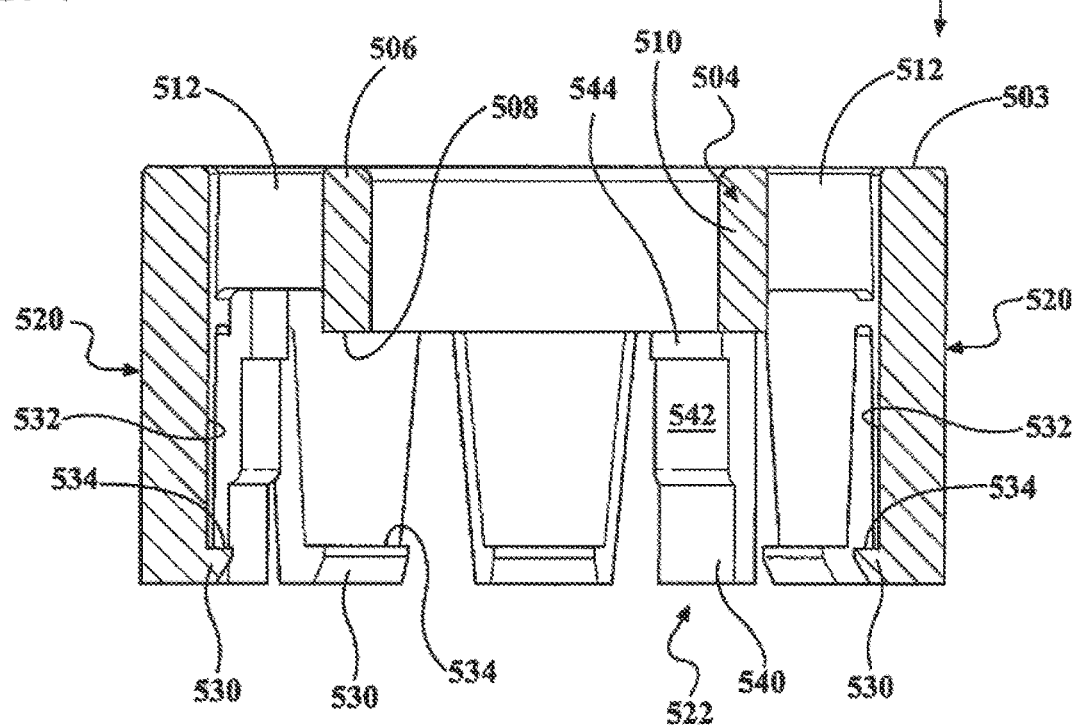
FIG. 7 is a cross-sectional view generally taken along line 7-7 in FIG. 6.

A plurality of radially extending ribs 512 form spokes extending radially outward between inner support ring 504 and first outer annular ring 502. Ribs 512 are circumferentially spaced about first end of first outer annular ring 502 and have an overall length extending from first end 503 of first outer annular ring 502 and first end 506 of inner support ring 504 for a predetermined distance less than the length of inner support ring 504 as shown in FIGS. 5 and 7.

A plurality of primary latch fingers 520 and a plurality of stepped fingers 522 are formed on the body of assurance cap 500 and are arranged in an annular, circumferential spaced, arrangement extending parallel to the longitudinal axis of assurance cap 500 from first annular ring 502 at first end 503 of assurance cap 500.

Primary latch fingers 520 and stepped fingers 522 are arranged in a generally alternating arrangement around the periphery of first end 503 of assurance cap 500. Although primary latch fingers 520 and stepped fingers 522 may alternate in a circumferentially spaced side-by-side arrangement of one primary latch finger 520 located between two stepped fingers, by example only, as shown in FIGS. 4-7, two primary latch fingers 520 are arranged in a spaced side-by-side pair between single stepped fingers 522. This arrangement of two primary latch fingers 520 between two spaced stepped fingers 522 continues in a circumferential consecutive manner about periphery 503 of the body of assurance cap 500.

Primary latch fingers 520 are formed of an axially extending member with a generally planar, slightly arcuate leg 524 which is recessed a short distance below the outer periphery of first outer annular ring 502. Elongated rib or structural support 526 is integrally formed on leg 524 and projects axially from the outer peripheral edge of annular ring 502. Rib 526 provides structural support for leg 524 of primary latch fingers 520 while still allowing flexure of primary latch fingers 520 as described hereafter.

Leg 524 of each primary latch finger 520 terminates in outer end 528. Projection 530 is formed on outer end 528 of primary latch fingers 520 and projects radially inward from inner surface 532 of primary latch finger 520 to form shoulder 534 extending radially inward from outer end 528 of primary latch finger 520.

Stepped fingers 522 have an outmost first step 540 which terminates in outer end 541 contiguous with outer end 528 of each primary latch finger 520. Second step 542 is disposed axially adjacent first step 540 and has an inner surface disposed radially inward of the inner surface of first step 540. Third step 544 is disposed axially adjacent second step 542 and has an inner surface disposed radially inward of the inner surface of second step 542.

Primary latch fingers 520 and stepped fingers 522 are circumferentially spaced apart by slots 550 which open at first ends 528 and 541 of primary latch fingers 520 and stepped fingers 522, respectively. Slots 550 are generally axially aligned with ribs 512. Slots 550 provide a degree of flexibility to primary latch fingers 520 and stepped fingers 522.

Figure 3A:
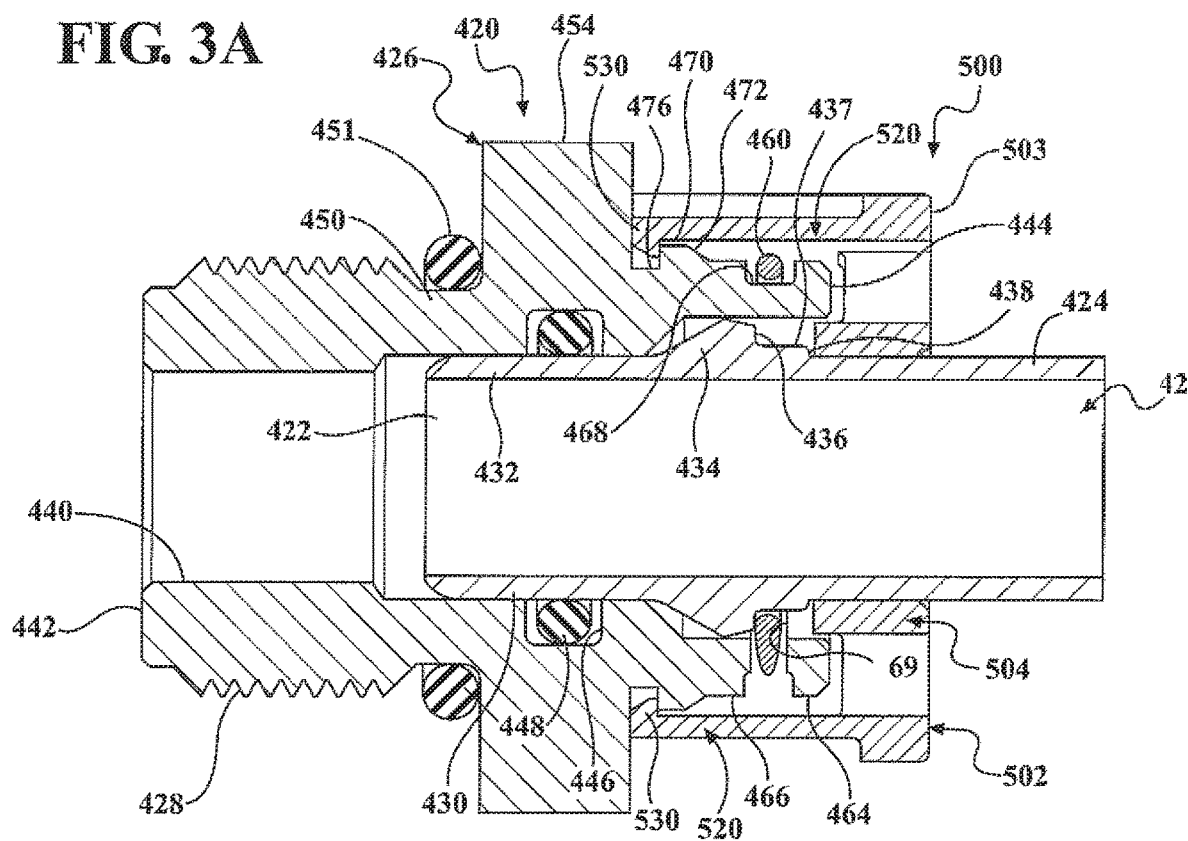
FIG. 3A is a longitudinal cross-sectional view generally taken along line 3A-3A in FIG. 2.
Figure 3B:
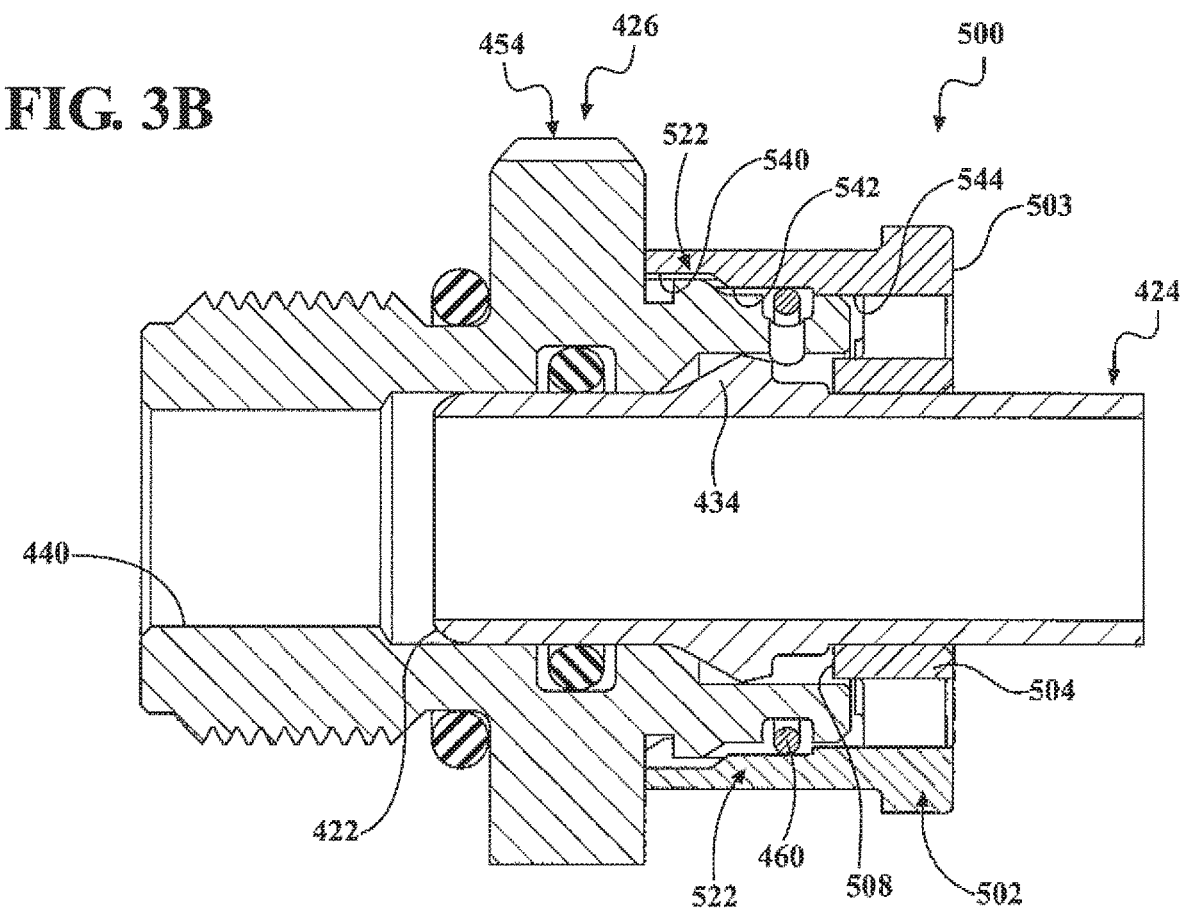
FIG. 3B is a longitudinal cross-sectional view generally taken along line 3B-3B in FIG. 2.
Figure 4:
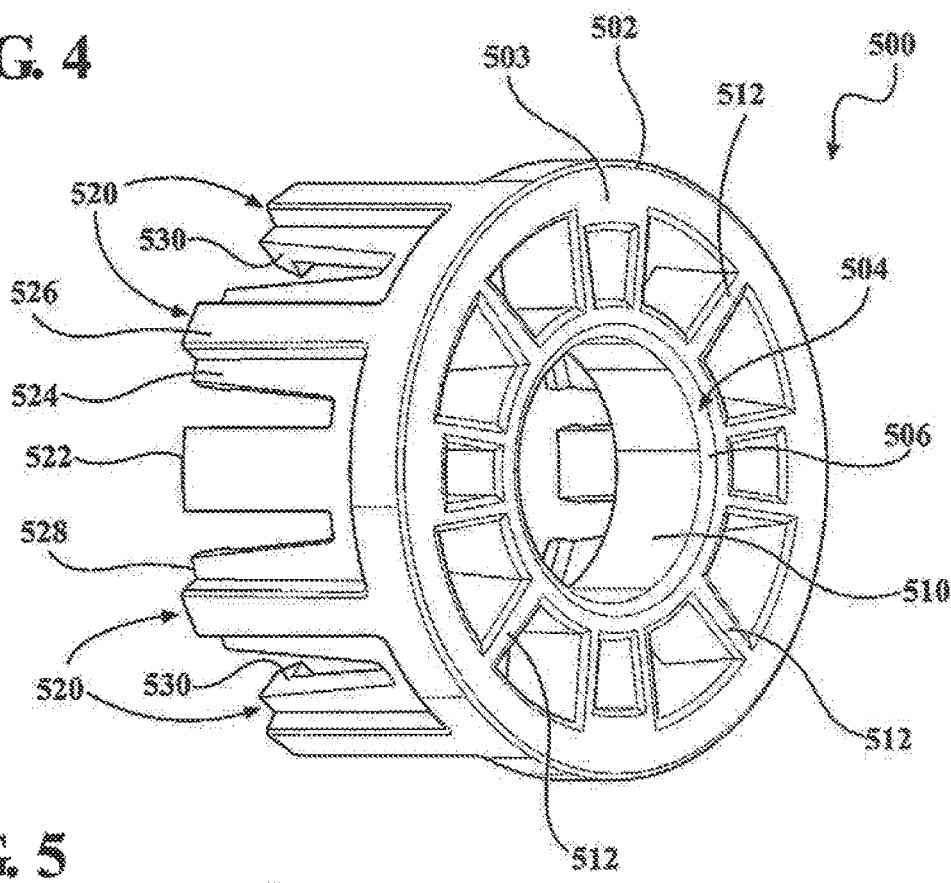
FIG. 4 is a perspective view of a right end of the assurance cap shown in FIG. 2.
Figure 8:
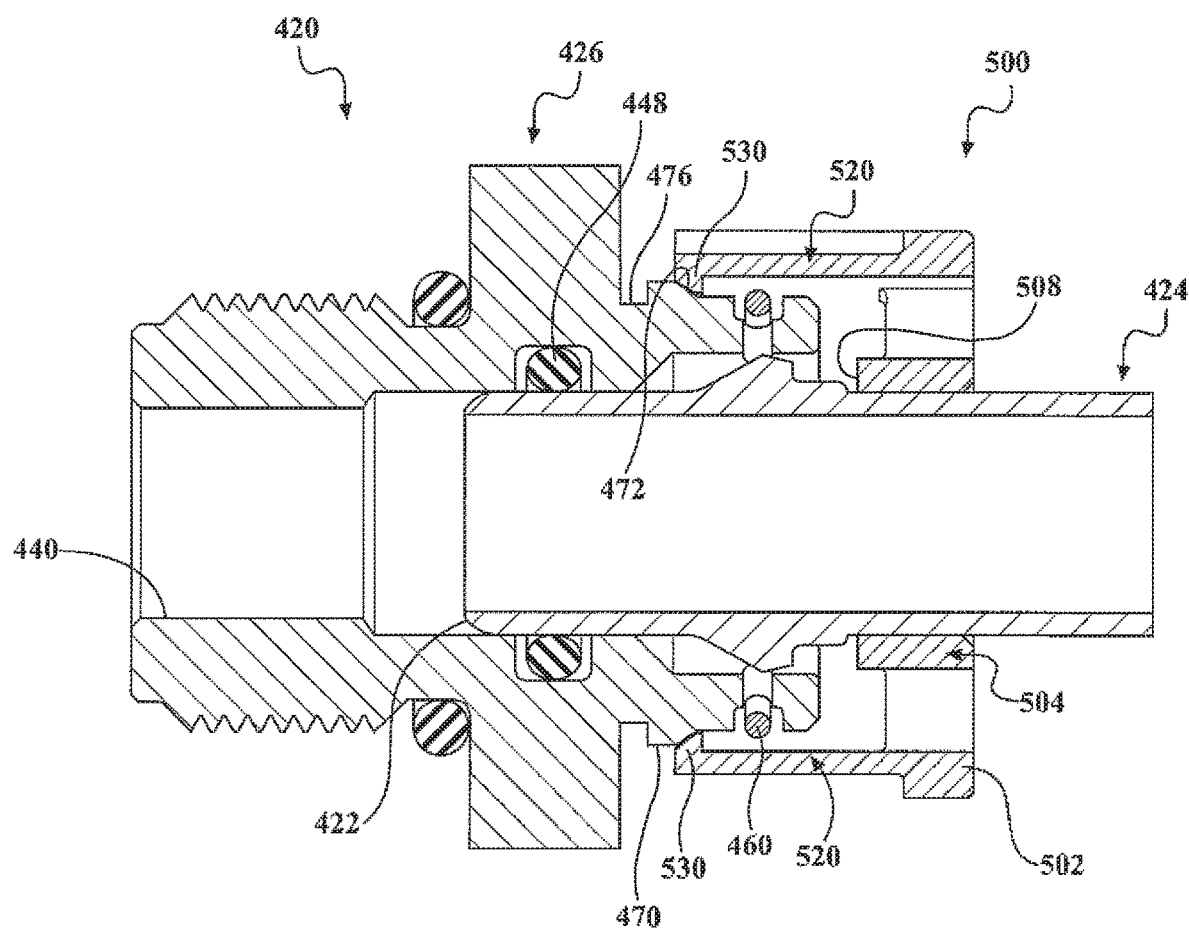
FIG. 8 is a longitudinal cross-sectional view showing the position of the assurance cap and quick connector body when the tubular member is not fully inserted into the quick connector body.

Referring to FIGS. 3B and 8, assurance cap 500 is first installed over tubular member 424 from either end of tubular member 424 prior to formation of endform 434 adjacent first end 422 of tubular member 424. Endform 434 slidably captures assurance cap 500 on tubular member 424.

Alternately, assurance cap 500 may be inserted over tubular member 424 from the end of tubular member 424 opposite first end 422 prior to the connection of the opposite end of tubular member 424 to another component. Endform 434, in this alternate installation, can be pre-formed on tubular member 424 prior to the mounting of assurance cap 500 from the opposite end of tubular member 424.

When tubular member 424 is to be coupled to quick connector body 426, first end 422 of tubular member 424 is inserted through open first end 444 of connector body 426. The ramp surface of endform 434 of tubular member 424 will engage the radially inward extending projection on clip 460 and force the entire clip 460 radially outward until, when first end 422 of tubular member 424 is fully inserted into bore 440 in connector body 426, projections on clip 460 snap radially inward to their relaxed normal state behind shoulder 436 on endform 434 on tubular member 424.

When tubular member 424 is locked to connector body 426 by clip 460, the operator can slide assurance cap 500 toward hexagonal portion 454 of quick connector body 426. Projections 530 on outer ends 528 of primary latch fingers 520 will engage ramp surface 472 on connector body 426 forcing the ends of primary latch fingers 520 radially outward. When assurance cap 500 is in the fully forward position, projections 530 snap into recess or groove 476 on connector body 426 latching assurance cap 500 to quick connector body 426. At the same time, as shown in FIG. 3B, second step 542 of each stepped finger 522 will be located circumferentially over the outer surface of clip 460. This arrangement holds clip 460 in its normal non-expanded state and prevents expansion of clip 460 due to any axial separation forces exerted on connector body 426 and/or tubular member 424 tending to disengage or separate connector body 426 and tubular member 424. Stepped fingers 522 thereby act as an axillary latch for assurance cap 500.

The arrangement of alternating pair of primary latch fingers 520, one stepped finger 522, pair of primary latch fingers 520, etc. about the circumference of assurance cap 500 enables one or two of stepped fingers 522 to be in contact with clip 460 at all annular positions of assurance cap 500 relative to quick connector body 426.

When projections 530 on primary latch fingers 520 are in the fully latched position in groove 476 on quick connector body 426, inner end 508 of inner support ring 504 will be in engagement with shoulder 438 on raised bead or flange 437 on tubular member 422. This serves as a secondary latch function securing assurance cap 500 to connector body 426 and tubular member 424 in the fully inserted position of tubular member 424 in connector body 426 between engaged projections 530 of primary latch fingers 520 in groove 476 and engaged inner end 508 of inner support ring 504 with flange 437 on tubular member 422.

Referring briefly to FIG. 8, the primary function of assurance cap 500 is to ensure that tubular member 424 is fully inserted into quick connector body 426 so that tubular member 424 can be latched in place by clip 460. During the insertion of tubular member 424 into bore 440 in quick connector body 426, the installer may feel resistance to forward insertion movement of tubular member 424 into bore 440 when, for example, first end 422 of tubular member 424 contacts O-ring 448 in the interior of quick connector body 426. This may give a false full insertion indication to the installer. However, assurance cap 500 is configured so that at all non-fully inserted positions of tubular member 424 relative to quick connector body 426, projections 530 on ends 528 of primary latch fingers 520 will not be fully latched in recess or groove 476 in connector body 426; but rather, will be in engagement with ramp surface 472 on radial outer surface 470 on connector body 426 as shown in FIG. 8. This prevents latching of primary latch fingers 520 to quick connector body 426. A non-fixed position of body 426 or a slight pull-out movement by the installer exerted on assurance cap 500 moving assurance cap 500 away from body 426 will provide an indication of non-latching of assurance cap 500 to quick connector body 426.

At the same time, assurance cap 500, due to the rib support structure of primary latch fingers 520 and the number of such primary latch fingers 520 on assurance cap 500 and the primary latching of projections 530 of primary latch fingers 520 in groove 476 of quick connector body 426 and the engagement of inner end 508 of inner support ring 504 with shoulder 438 on flange or bead 437 on tubular member 424, provides a resistance force sufficient to prevent axial separation of tubular member 424 from quick connector body 426 despite any axial separation forces acting on quick connector body 426 and tubular member 424.

Figure 9:
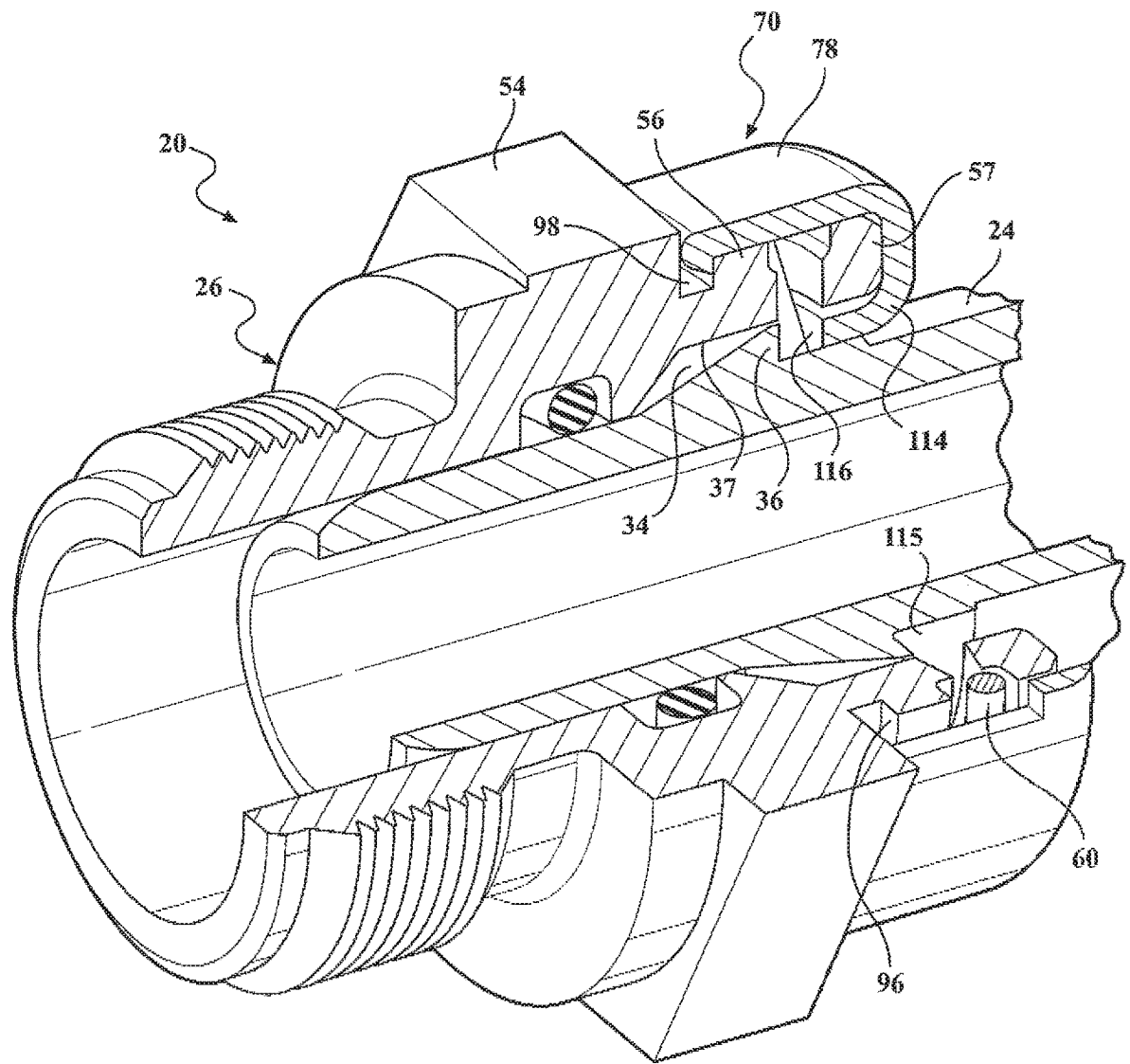
FIG. 9 is a partially cross-sectioned perspective view of a quick connector body with another aspect of an assurance cap.
Figure 10:
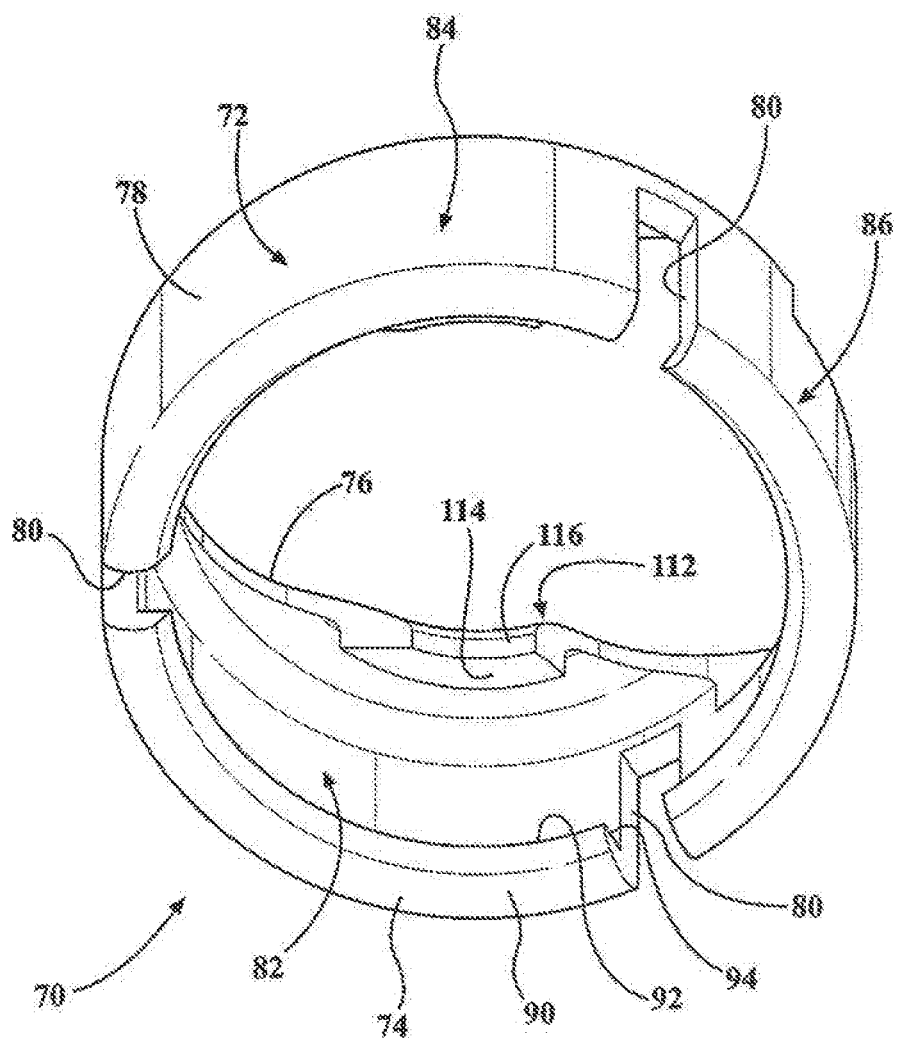
FIG. 10 is a perspective view of one end of the assurance cap shown in FIG. 9.
Figure 11:
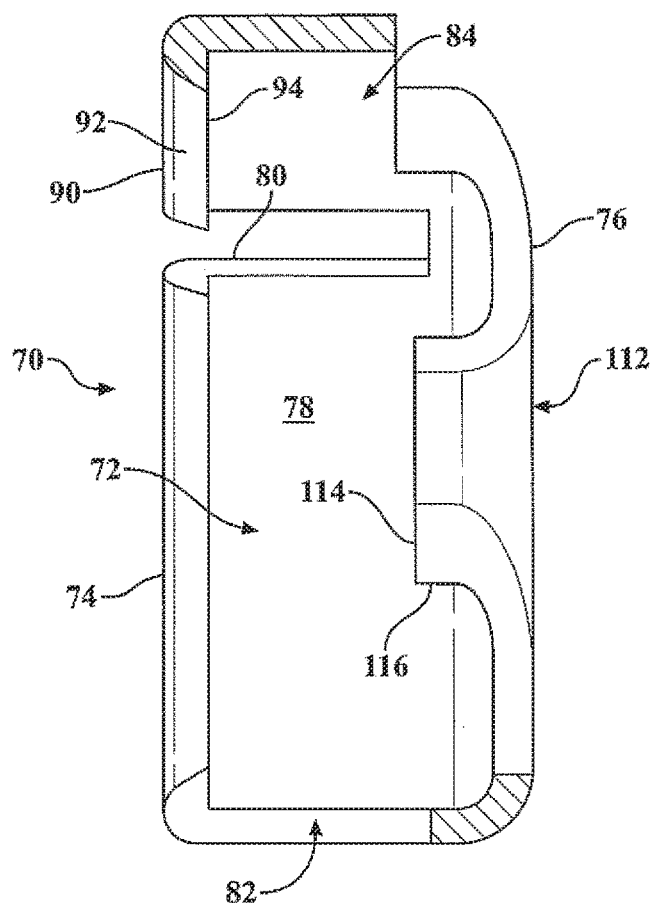
FIG. 11 is a partially cross-sectioned side elevation view of the assurance cap shown in FIG. 10.
Figure 12:
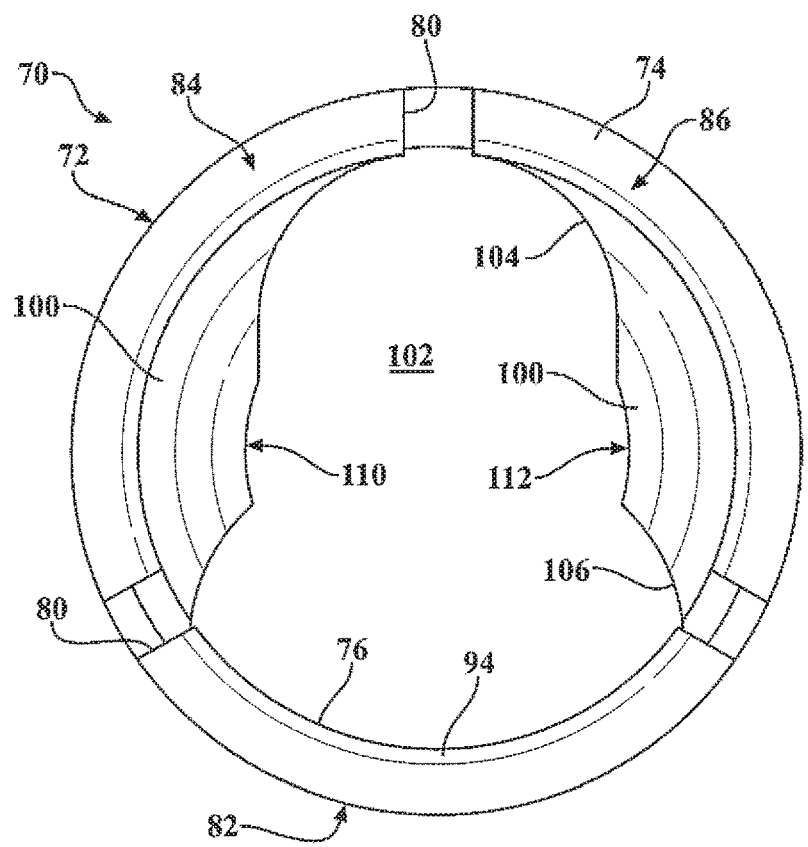
FIG. 12 is a view of an opposite end of the assurance cap shown in FIG. 10.
Figure 13:
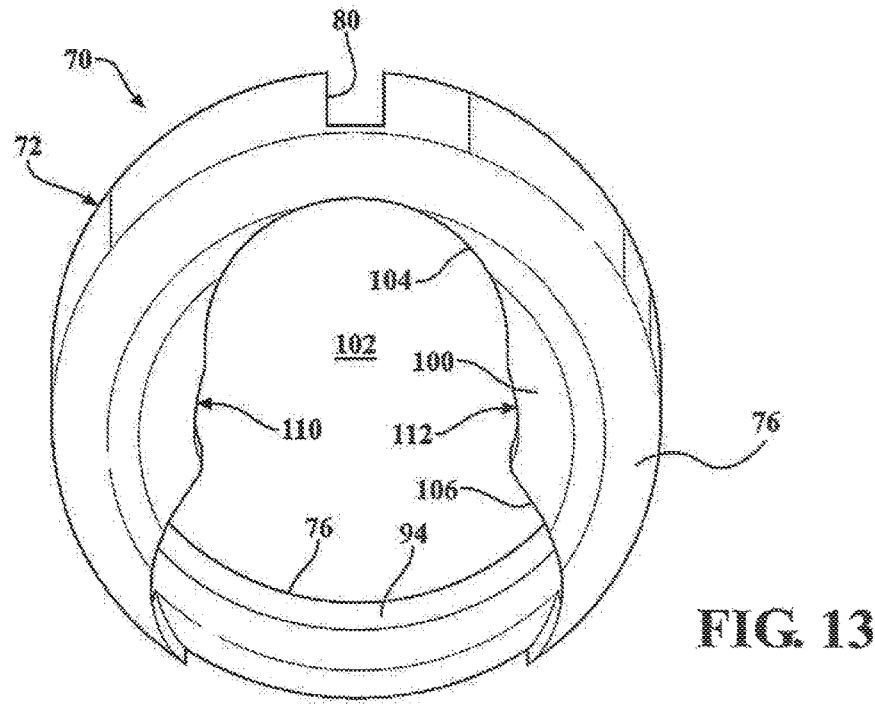
FIG. 13 is a perspective view of an opposite end of the assurance cap shown in FIGS. 10-12.
Figure 14:
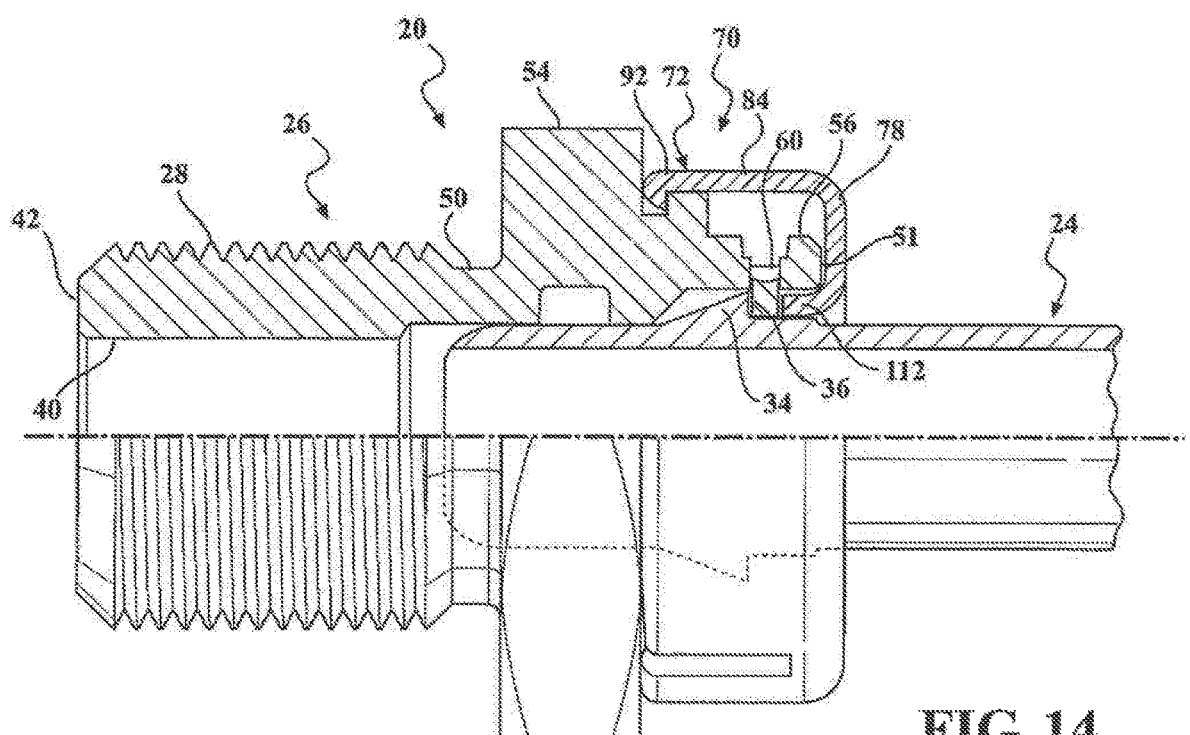
FIG. 14 is a longitudinal cross-sectional view showing the fully latched position of the assurance cap of FIGS. 9-13 on the quick connector body.

FIG. 9 depicts fluid connector assembly 20 of FIG. 1 which is used to sealingly lock tubular member 24 to body 26. However, fluid connector assembly 20 in FIG. 9 includes a novel assurance cap 70 which provides assurance of a full insertion of tubular member 24 into body 26 and, at the same time, provides secondary latches to hold assurance cap 70 on body 26 and to provide an additional latching force against disengagement of tubular member 24 from body 26.

Assurance cap 70, shown in an assembled position in FIG. 9 and in detailed views in FIGS. 10-14 and FIGS. 15A-15D, can be formed of a material having a suitable strength, such as high strength plastic, or a metal, such as stainless steel, aluminum, etc.

In this aspect, assurance cap 70 is in the form of annular body 72 having a first end 74, an opposed second end 76, and an intermediate sidewall 78 extending between first and second ends 74 and 76. At least one or a plurality of slots 80, with three slots 80 shown by example, are formed through first end 74 and a portion of sidewall 78 to separate sidewall 78 into a plurality of fingers with three fingers 82, 84, and 86 being shown by example in FIGS. 10-14. Slots 80 and intervening fingers 82, 84, and 86 provide flexibility to assurance cap 70 allowing first end 74 of assurance cap 70 to flex radially outward over the outer surface of receiving portion 56 of body 26 until assurance cap 70 has reached its fully forward position of movement, as described hereafter.

First end 74 of each finger 82, 84, and 86 has a rounded over end portion 90 which terminates in radially inward extending edge 92 forming shoulder 94. Shoulder 94 is configured to snap over and engage mating shoulder 96 formed along one side of open ended annular groove 98 formed in body 26 between hexagonal portion 54 and receiving portion 56 of body 26. Shoulders 94 on each finger 82, 84, and 86, which extend over substantially the entire circumference of assurance cap 70, provide a secure circumferential secondary latching force to secure assurance cap 70 on body 26 as well as providing additional latching force to resist separation of tubular member 24 from body 26.

Second end 76 of assurance cap 70 has a partially closed, irregularly shaped endwall 100 which includes keyhole shaped aperture 102 having reduced diameter or width first end portion 104 and larger diameter second end portion 106. The walls forming first end portion 104 and second end portion 106 are generally arcuate to enable assurance cap 70 to be mounted over first end 22 of tubular member 24 as described hereafter and shown in FIGS. 15A-15D.

A pair of diametrically opposed, inward extending fingers 110 and 112 are provided generally centrally in endwall 100 on second end 76 of assurance cap 70. Fingers 110 and 112, with only finger 112 shown in FIG. 10, have an inward curled wall 114 terminating in inner edge wall 116. As shown in FIG. 9, wall 114 is generally parallel to intermediate sidewall 78 of assurance cap 70, with inner edge wall 116 facing, but spaced from, resilient clip 60.

Edge walls 114 will rest on raised bead 115 on tubular member 24 extending from shoulder 36 at the fully inserted position of tubular member 24 in body 26 latching assurance cap 70 on body 26 between shoulders 94 on fingers 82, 84, and 86 and fingers 110 and 112.

Fingers 110 and 112 provide an additional engagement or latching function for assurance cap 70 on body 20 when assurance cap 70 is in the full forward, latched position shown in FIG. 9.

Figure 15A:
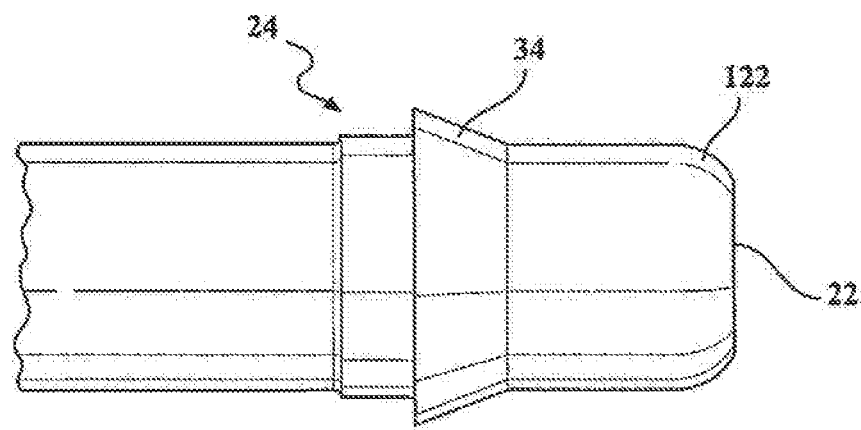
FIG. 15A is a side elevational view of a fluid tube insertable into the quick connector body.
Figure 15B:
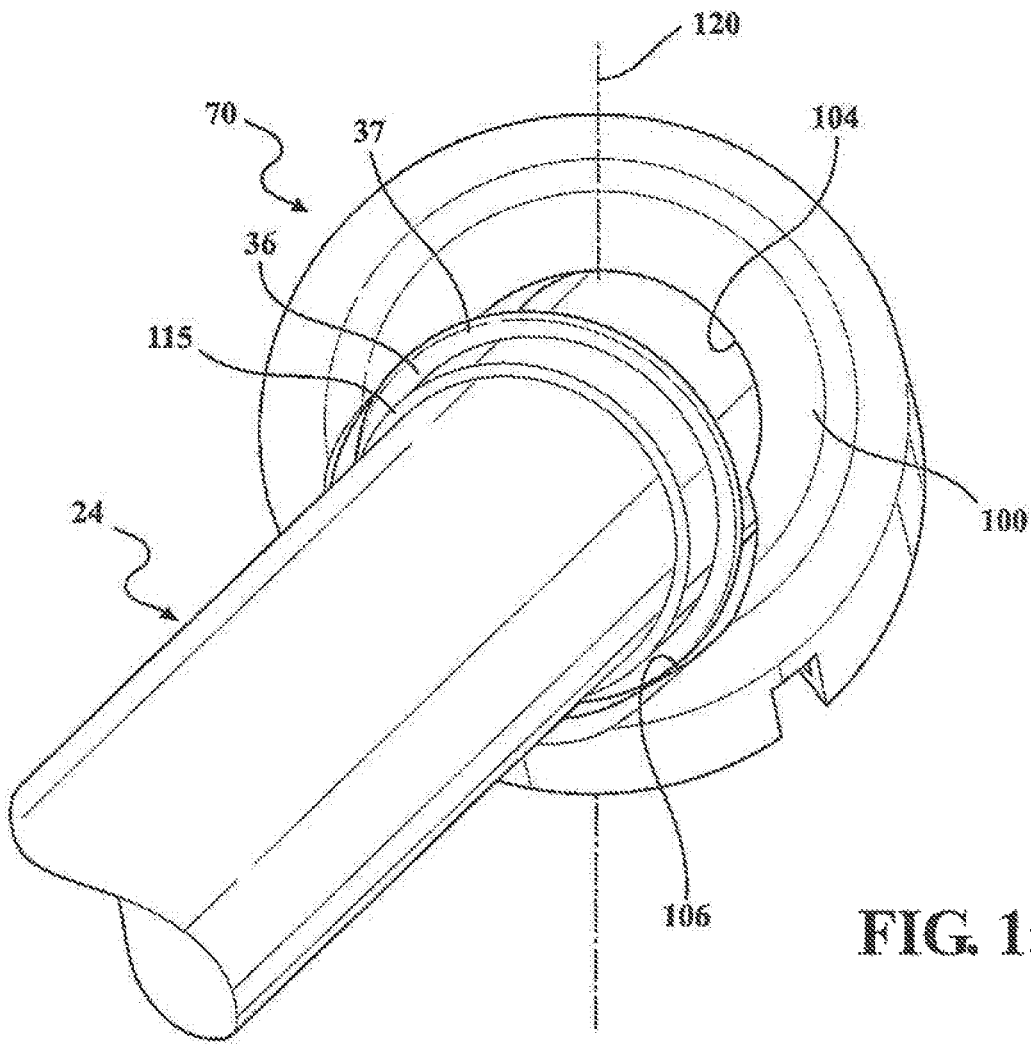
FIGS. 15B, 15C, and 15D show a perspective view of the installation of the tubular member shown in the assurance cap of FIGS. 9-13 to pre-mount the assurance cap on the tubular member.

FIGS. 15A-15D depict the orientation of tubular member 24 and assurance cap 70 for mounting of assurance cap 70 over first end 22 of tubular member 24 and tapered surface 34. At the time of assembly, assurance cap 70 is oriented as shown in FIG. 15B with longitudinal axis 120 extending through keyhole shaped aperture 102 oriented at an angle along axis line 122 of tubular member 24 in FIG. 15A to bring larger diameter or width second end portion 106 of keyhole shaped aperture 102 over large diameter end 37 of endform tapered surface 34 of tubular member 24.

Figure 15C:
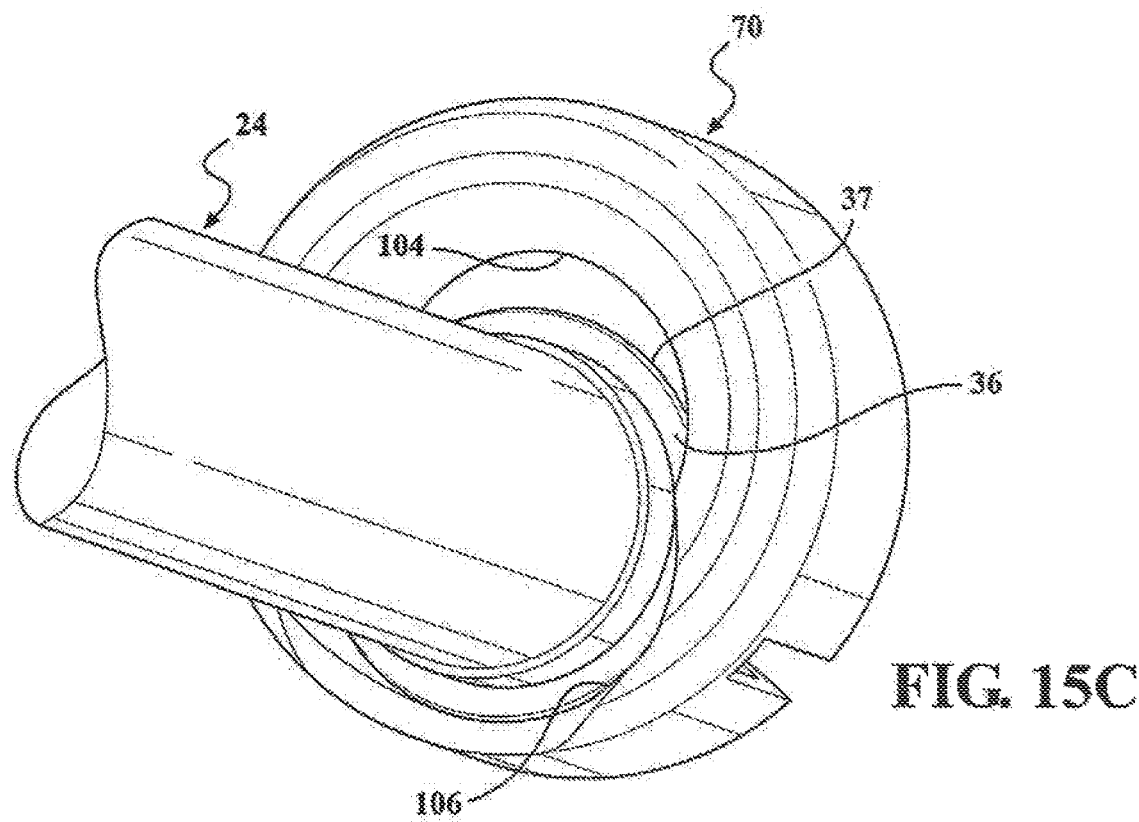

The other end of assurance cap 70 can then be pivoted in the direction of arrow 124 in FIG. 15C to move the entire keyhole shaped aperture 102 over large diameter end 37 of endform tapered surface 34 of tubular member 24 until first end 74 of assurance cap 70 clears large diameter end 37 of endform tapered surface 34 of tubular member 24.

Figure 15D:
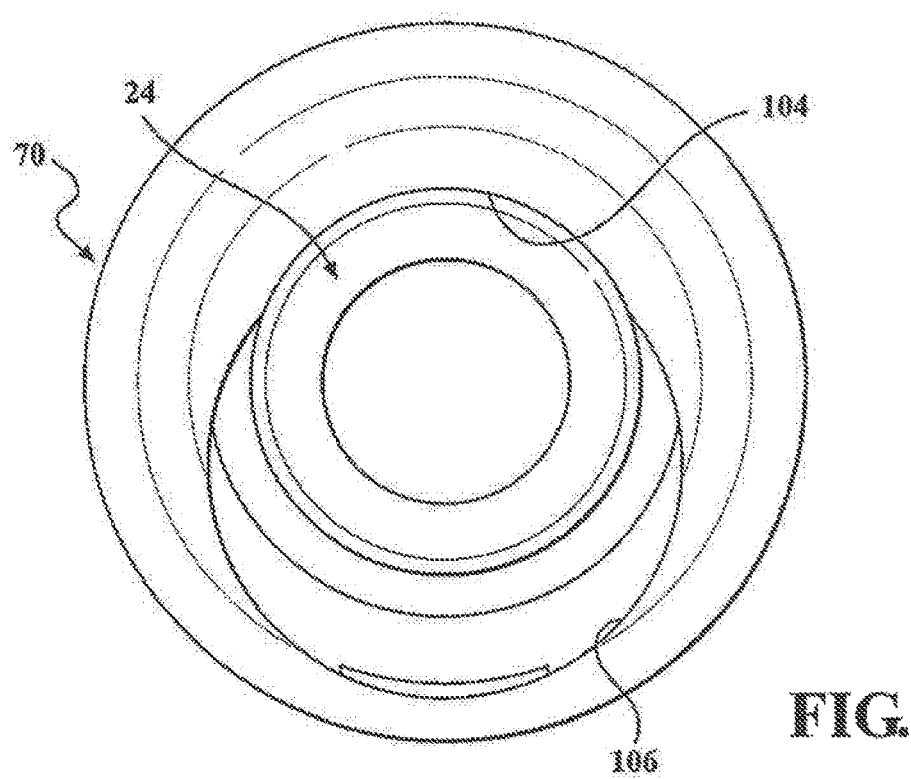

After large diameter end 37 of endform tapered surface 34 of tubular member 24 has been urged past the inner edges of large diameter end portion 106 of keyhole aperture 102 in assurance cap 70, assurance cap 70 can be tilted upward toward a perpendicular orientation with respect to a longitudinal axis of tubular member 24 and moved longitudinally along tubular member 24 until the inner edges of keyhole shaped aperture 102 are completely past large diameter end 37 of tapered surface 34 of tubular member 24, as shown in FIG. 15C. Assurance cap 70 can then be urged or slid into smaller diameter first end portion 104 of keyhole shaped aperture 102 to center assurance cap 70 with respect to tubular member 24 as shown in FIG. 15D.

Figure 16C:
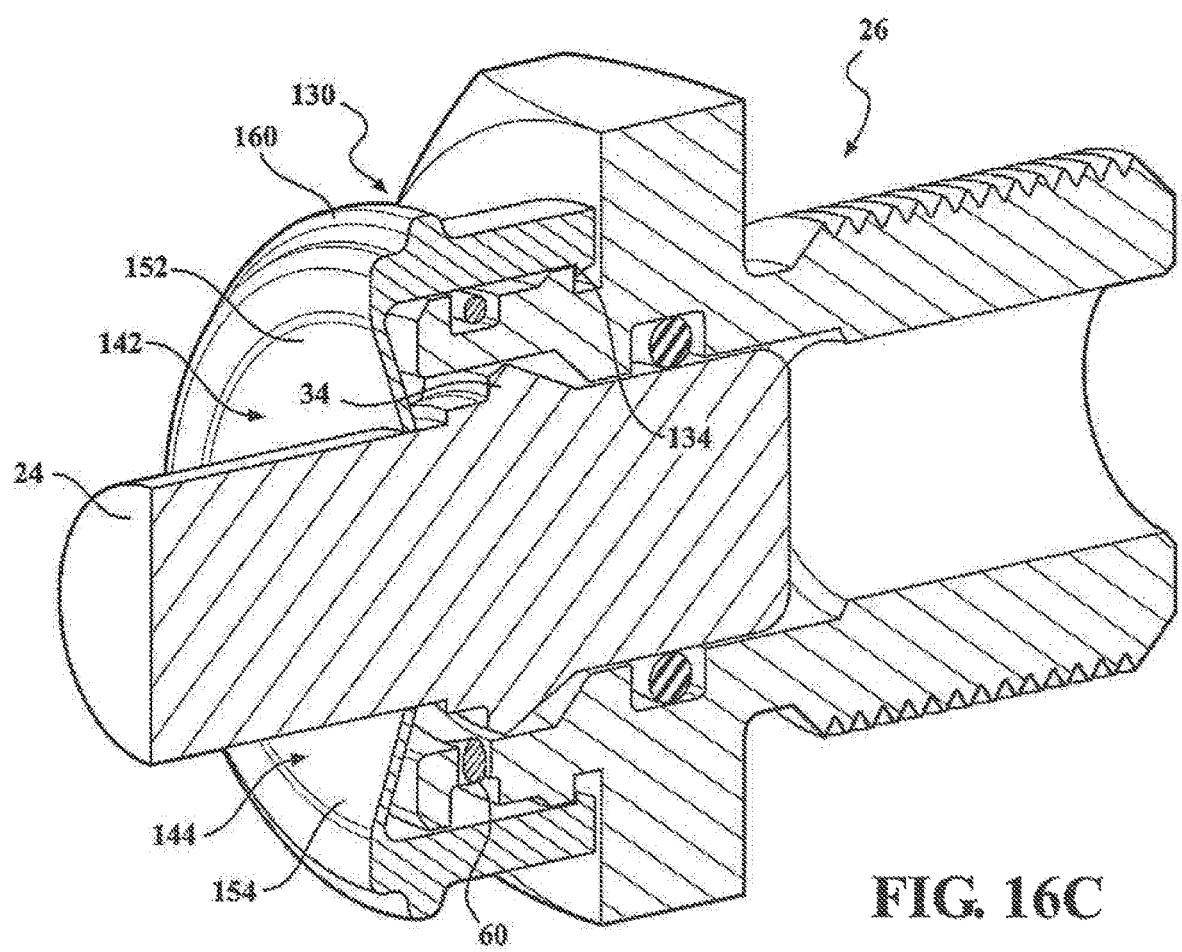
FIG. 16C is a longitudinal cross-sectioned, perspective view of the assurance cap shown in FIGS. 16A and 16B mounted on a tubular member fully inserted mounting position on a quick connector body.

Referring now to FIGS. 16A, 16B and 16C, there is depicted another aspect of assurance cap 130 which functions in the same manner as assurance cap 70 described above and shown in FIGS. 9-15D. Assurance cap 130 has a plurality of longitudinally extending, spaced fingers 132, each with radially inward extending edge 134 terminating in shoulder 136 configured to latchably engage edge 96 of groove 98 in body 26 to secure assurance cap 130 in position at its forward most position of movement relative to tubular member 24 and body 26. It should be noted that instead of three longer circumferential length fingers 82, 84, and 86, fingers 132 in assurance cap 130 are smaller in length and greater in number to provide a greater degree of flexibility to enable assurance cap 130 to be easily slid over the raised end of receiving portion 56 of body 26.

Assurance cap 130 has a body with hinge 140 interconnecting first body section 142 with second body section 144. First and second body sections 142 and 144 are pivotally movable with respect to each other about hinge 140 from an open position shown in FIG. 16B which enables assurance cap 130 to be mounted over tubular member 24 to a closed position forming a continuous body about tubular member 24 by pivotal movement of first and second body sections 142 and 144 toward each other about hinge 140 until a latch finger 146 on second body section 144 engages latch recess 148 in the opposite first body section 142 as shown in FIG. 16B. The engagement of latch finger 146 in latch recess 148 locks first and second body sections 142 and 144 of assurance cap 130 into a continuous body encircling tubular member 24.

It should also be noted that second end of assurance cap 130 has a radially inward extending skirt formed of first skirt portion 152 on first body section 142 of assurance cap 130 and second skirt portion 154 on second body section 144 of assurance cap 130. Arcuate inner edges 156 and 158 respectively on first and second skirt portions 152 and 154 form a continuous annular edge configured to engage or be slightly spaced from the outer surface of tubular member 24 when assurance cap 130 is slid to its forward most position over tubular member 24 and latched to body 26 as shown in FIG. 16C. First and second skirt portions 152 and 154 also act to center assurance cap 130 about tubular member 24 during the forward sliding movement of assurance cap 130.

Raised annular rib 160 is formed on the outer surface of assurance cap 130 between first and second ends to act as a gripping surface to facilitate movement of assurance cap 130 from a rest position about tubular member 24 to its forward position shown in FIG. 16C.

The two-part hinged cap described above and shown in FIGS. 16A-16B may be applied to any of the other assurance caps described herein. Particularly, assurance cap 500 described above and shown in FIGS. 2-8 can be split into two hinged body section by a slit along one slot 550, annular ring 502 at first end 503 of assurance cap 500 and inner support ring 504. This hinged arrangement for assurance cap 500 enables assurance cap 500 to be snapped around tubular member 424 after endform 434 has been formed on tubular member 424.

Figure 17A:
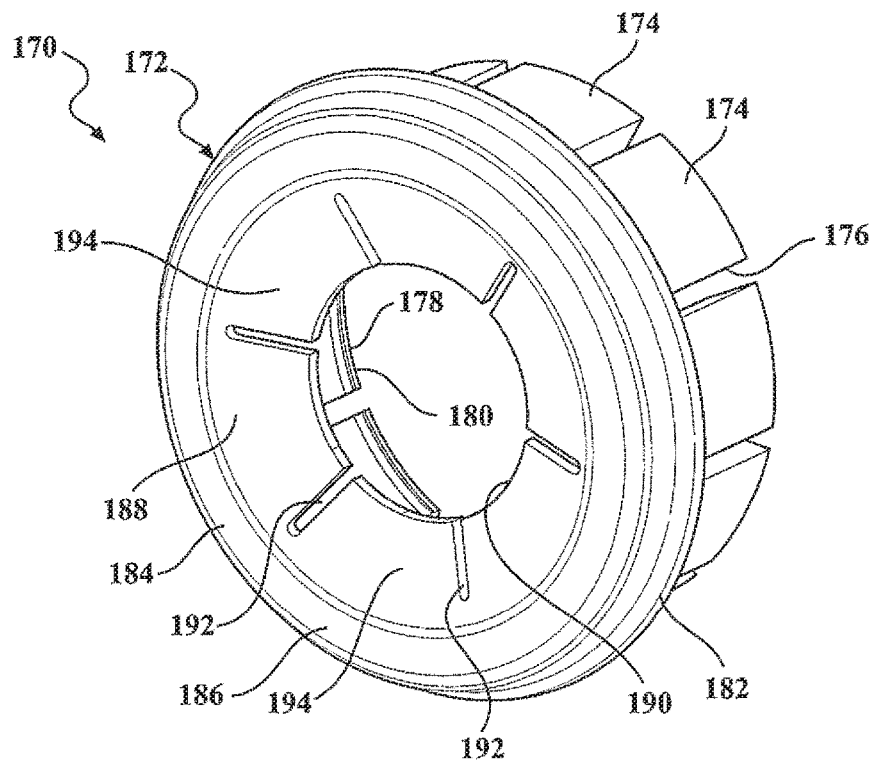
FIG. 17A is a perspective view of another aspect of an assurance cap.
Figure 17B:
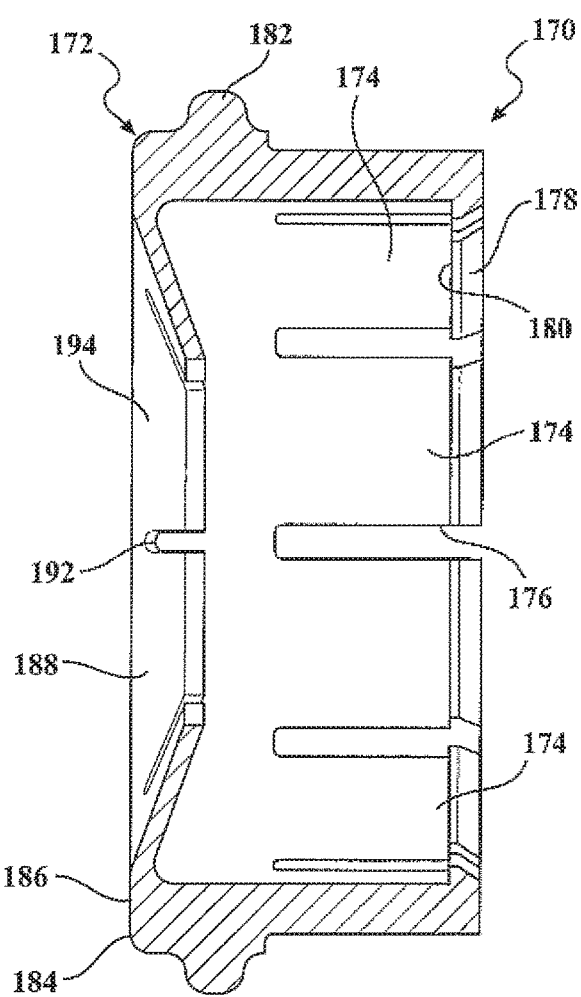
FIG. 17B is a cross-sectional view of the assurance cap shown in FIG. 17A.

FIGS. 17A and 17B show another modification in assurance cap 170. In this aspect, assurance cap 170 has a one piece, unitary, close annular, one-piece cylindrical-shaped body 172. The first end of body 172 has a plurality of fingers 174 spaced apart by longitudinally extending slots 176. Inward extending edges 178 terminating in radially inward extending shoulder 180 extend from one end of each finger 174 to engage edge 96 of groove 98 in body 26 to latch assurance cap 170 to body 26 in a forward most position of movement indicating full insertion of tubular member 24 in body 26.

Annular radially outward extending ring 182 is formed intermediate the first end and the opposed second end of body 172 to act as a gripping surface to facilitate movement of assurance cap 170.

Second end 184 of body 172 includes continuous annular outer ring 186 and radially inward conical-shaped skirt 188 extending from outer ring 186 to inner edge 190. A plurality of radially extending slots 192 are formed in skirt 188 and extend from inner edge 190 partially through the radial extent of skirt 188. Slots 192 divide skirt 188 into a plurality of radially inward, conically tapered fingers 194. Slots 192 provide flexibility to fingers 194 to enable assurance cap 170 to be forcibly urged over large diameter end portion 37 of tapered surface 34 on tubular member 24 to mount assurance cap 170 on tubular member 24 prior to insertion of tubular member 24 into body 26.

Figure 18A:
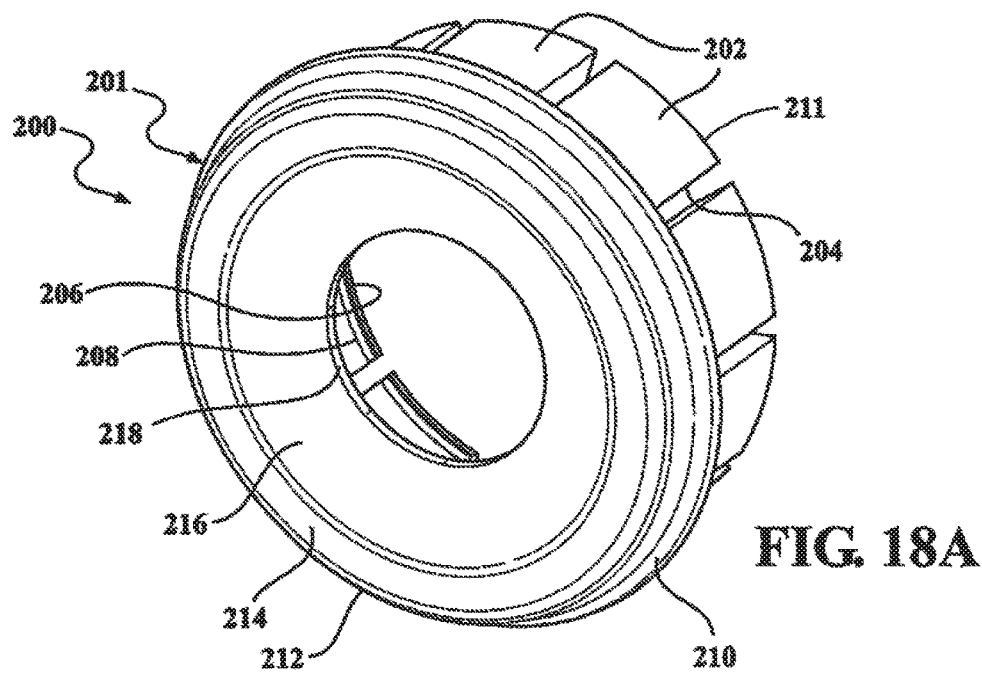
FIG. 18A is a perspective view of another aspect of an assurance cap.
Figure 18B:
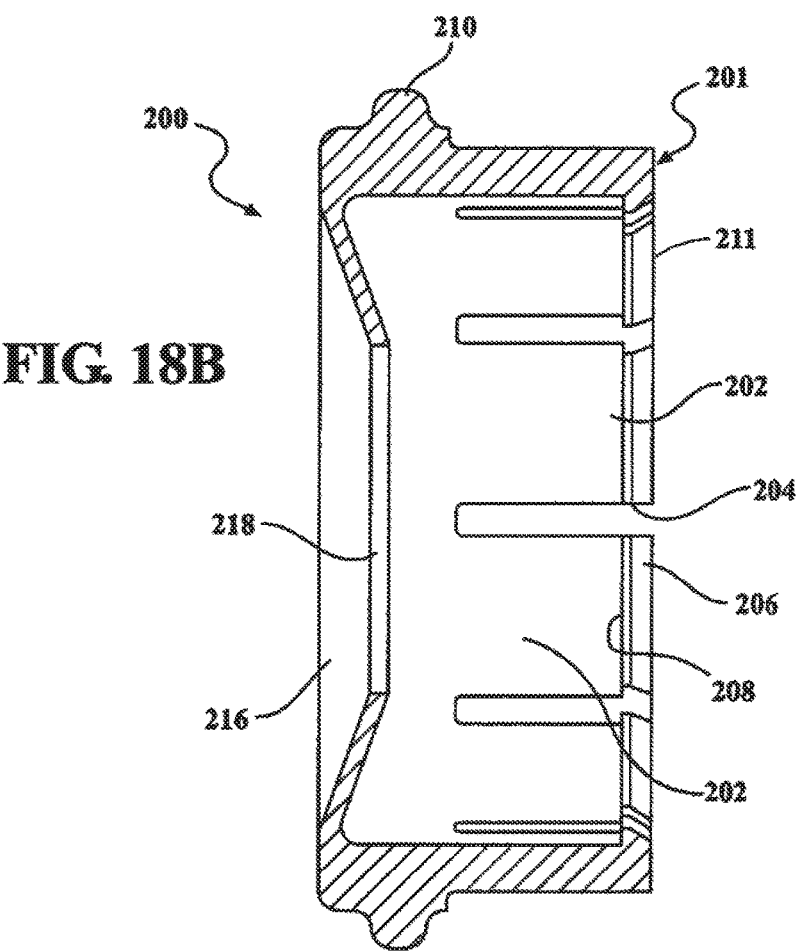
FIG. 18B is a cross-sectional view of the assurance cap shown in FIG. 18A.

FIGS. 18A and 18B depict another aspect of assurance cap 200 which is substantially similar to assurance cap 170 in that assurance cap 200 is formed of continuous one-piece body 201 having a plurality of fingers 202 at a first end spaced apart by slots 204. Fingers 202 terminate in inward extending edge 206 having inner shoulder 208 to engage edge 96 in groove 98 of body 26 when assurance cap 200 is moved to its forward position relative to body 26 indicating full insertion of tubular member 24 in body 26.

Radially outward extending rib 210 is formed in body 201 intermediate first end 211 and second end 212. Second end 212 of body 201 is formed as annular ring 214 from which conically shaped radially inward extending skirt 216 extends to inner edge 218 defining an aperture the same size or slightly larger than the outer diameter of the constant diameter portion of tubular member 24.

In this aspect of assurance cap 200, skirt 216 does not include any slots. This aspect has assurance cap 200 installed on tubular member 24 before the ramp or endform is formed.

Figure 19A:
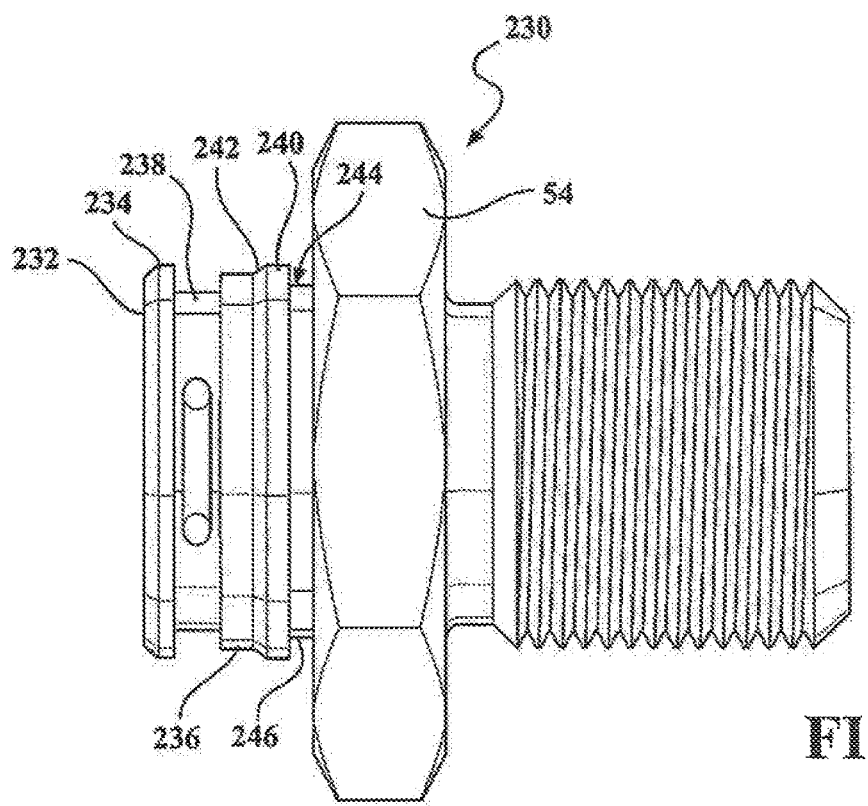
FIG. 19A is a side elevational view of another aspect of a quick connector body.
Figure 19B:
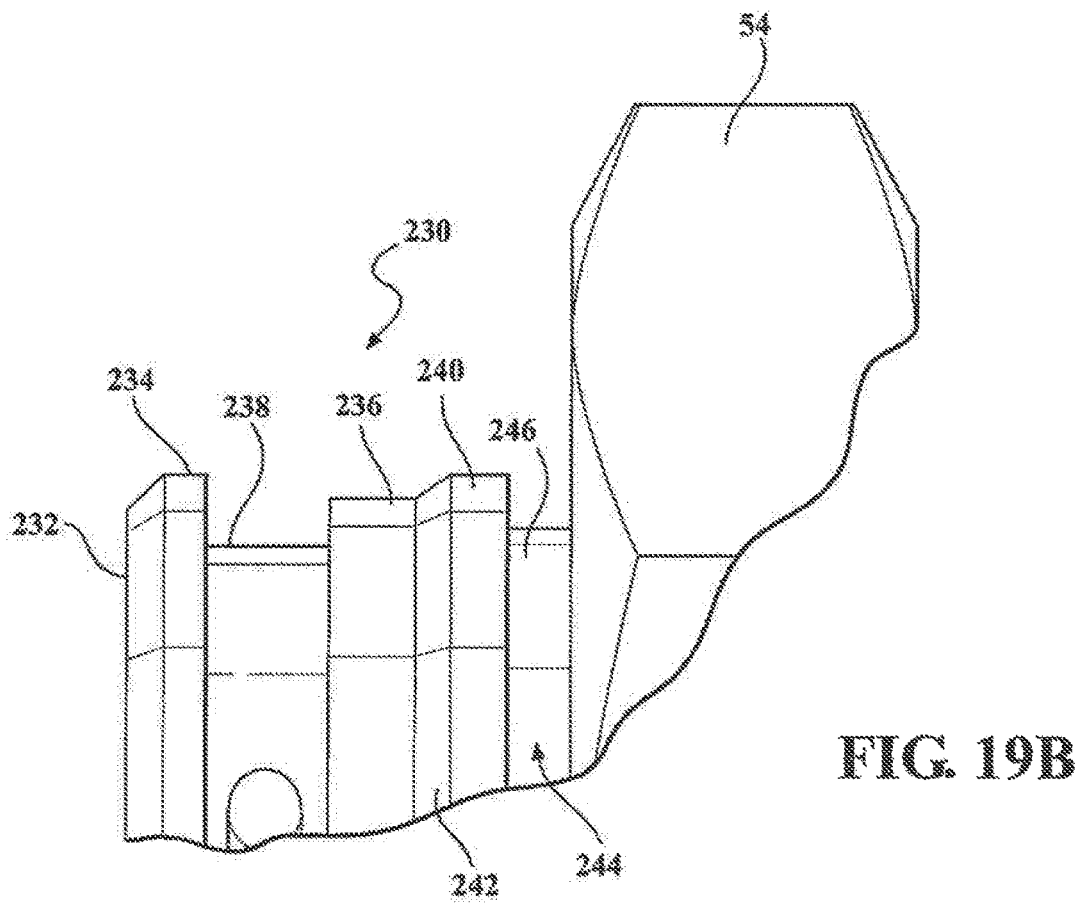
FIG. 19B is a partial, enlarged side elevational view of a portion of a quick connector body shown in FIG. 19A.

Referring now to FIGS. 19A and 19B, there is depicted another aspect of body 230, which includes variations from body 26 shown in FIG. 9. As most of body 230 is identically constructed as body 26, only variations between body 230 and body 26 will be described in detail.

As shown in body 26 depicted in FIG. 9, receiving portion 56 extending from end 57 of fitting body 26 has a constant outer diameter. This allows radially inward turned edges 92 of fingers 80, 82, and 84 on first end 74 of assurance cap 70 to snap into recessed groove 98 in body 26.

In body 230 depicted in FIGS. 19A and 19B, the receiving portion extending from first end 232 of body 230 has first diameter end portion 234 and second smaller diameter end portion 236 disposed on opposite sides of groove 238 which receives resilient clip 60. Raised intermediate annular ring 240 is formed adjacent to second end portion 236 and includes a radially outward, extending conically shaped, tapered endwall 242 extending from second end portion 236. The outer diameter of ring 240 is larger than the diameters of first and second end portions 234 and 236 of the receiving portion of body 230.

Recessed groove 244 is formed between annular ring 240 and hexagonal shaped portion 54 of body 230. Inner surface 246 of groove 244 has a diameter smaller than the diameter of second end portion 236 of the insertion portion of body 230 to define a recess for receiving the latch portions of the fingers of the assurance cap in the fully inserted position relative to body 26.

During such forward sliding movement of any of the assurance caps described above, the radially inward turned fingers of the assurance cap flex outward over tapered endwall 242 and then along the outer surface of ring 240 before snapping in latched engagement with groove 244 to provide the secondary latch function for the assurance cap.

Figure 20A:
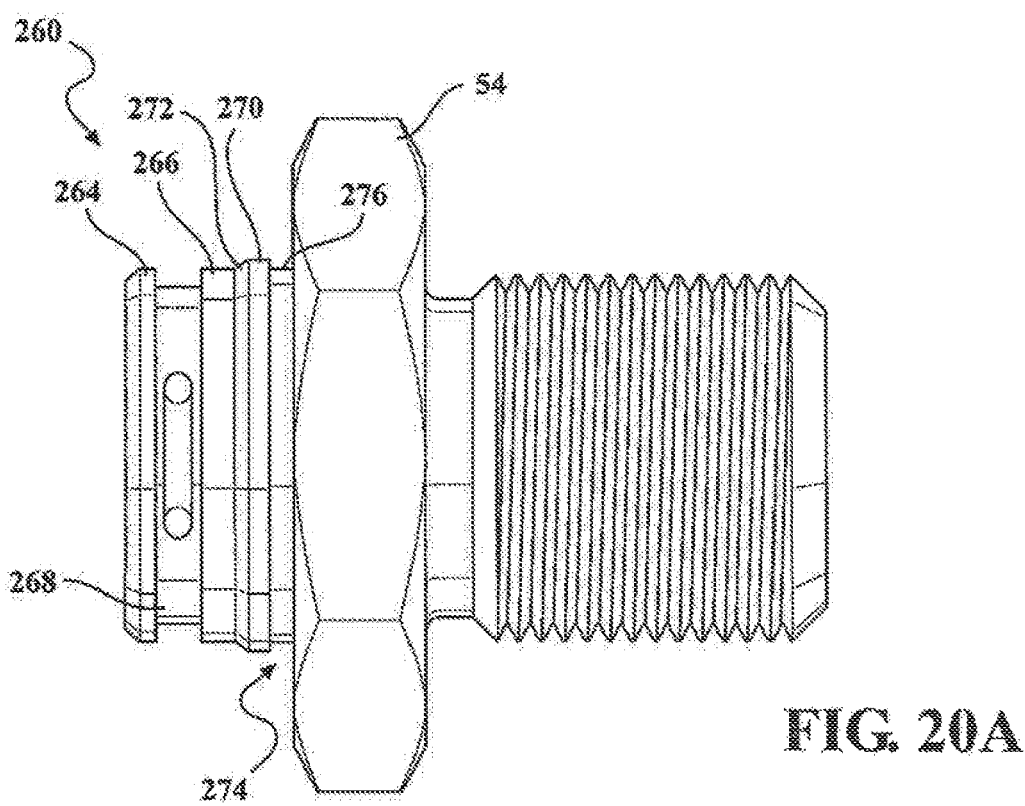
FIG. 20A is a side elevational view of another aspect of a quick connector body.
Figure 20B:
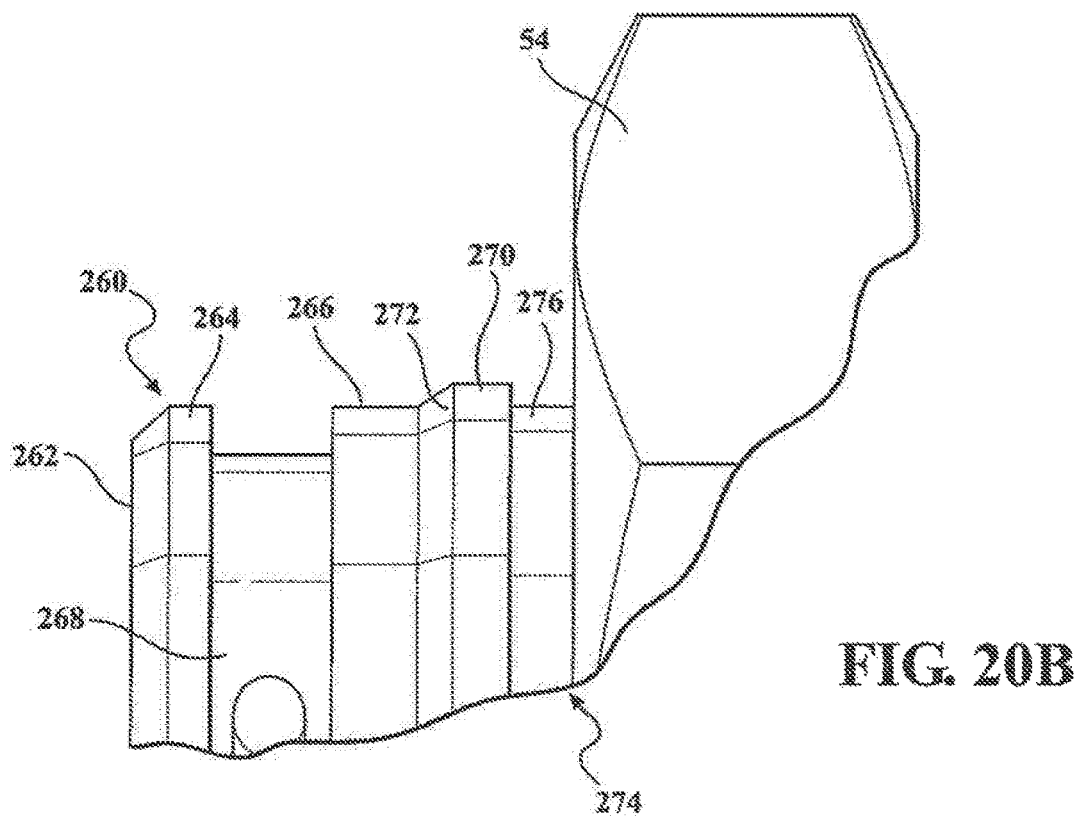
FIG. 20B is a partial, enlarged, side elevational view of a portion of a quick connector body shown in FIG. 20A.

In another variation of body 260 shown in FIGS. 20A and 20B, again body 260 is substantially the same as body 26 and only variations therebetween will be described in detail.

Like body 230 shown in FIGS. 19A and 19B, body 260 has first end 262 from which extends first end portion 264 of the receiving portion at a first diameter. The receiving portion includes second end portion 266, also at the same diameter to define recess 268 for resilient clip 60.

Body 260 also includes raised annular ring 270 having an outer diameter greater than the first diameters of first and second end portions 264 and 266. A radially outward, conical shaped tapered surface 272 extends from second end portion 266 to raised annular ring 270. Recess or groove 274 is formed between raised annular ring 270 and the hexagonal shaped portion of body 260. Inner surface 276 of groove 274 is spaced at the same first diameter of first and second end portions 264 and 266 of the receiving portion of body 260.

In this aspect, annular ring 270 forms a raised outermost portion of the receiving portion of body 260. The difference between the outer diameter of annular ring 270 and inner surface 276 of adjacent groove 274 requires that the fingers on the assurance cap can be flexed outward over the raised outer edge of annular ring 270 before snapping over the outer edge of annular ring 270 into groove 274.

Figure 21A:
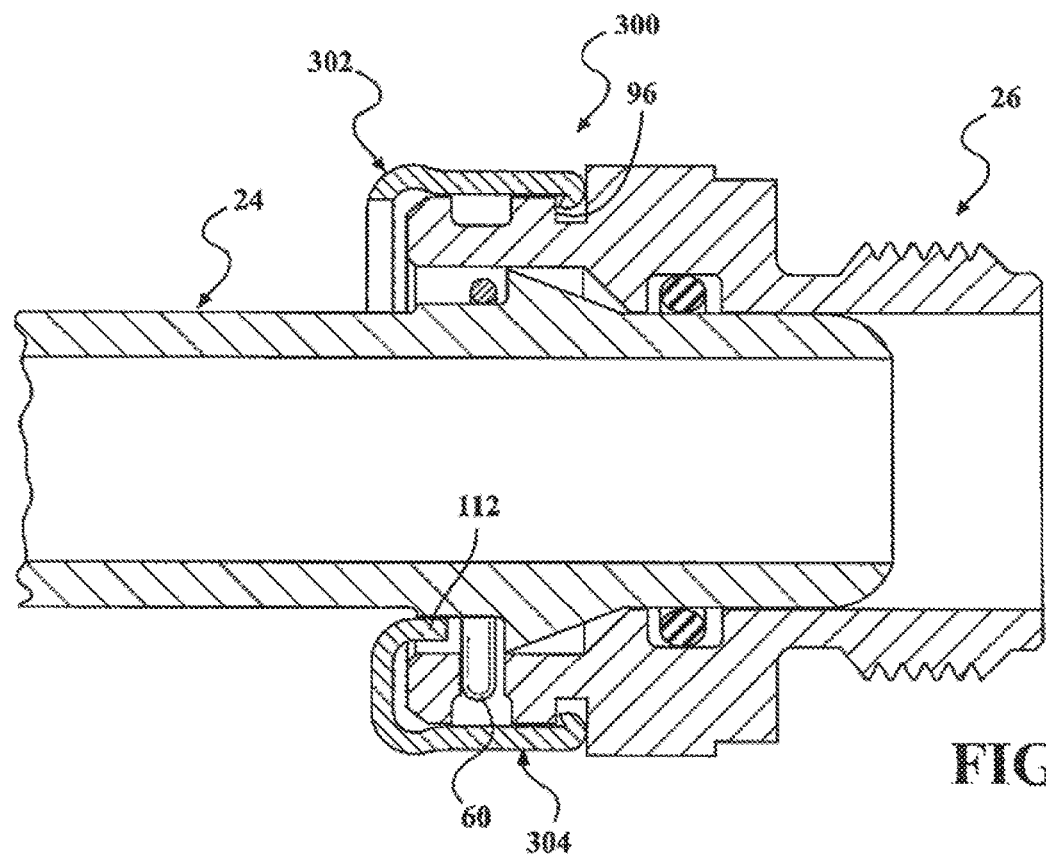
FIG. 21A is a longitudinal cross-sectional view of another aspect of an assurance cap shown in an assembled position on a quick connector body.
Figure 21B:
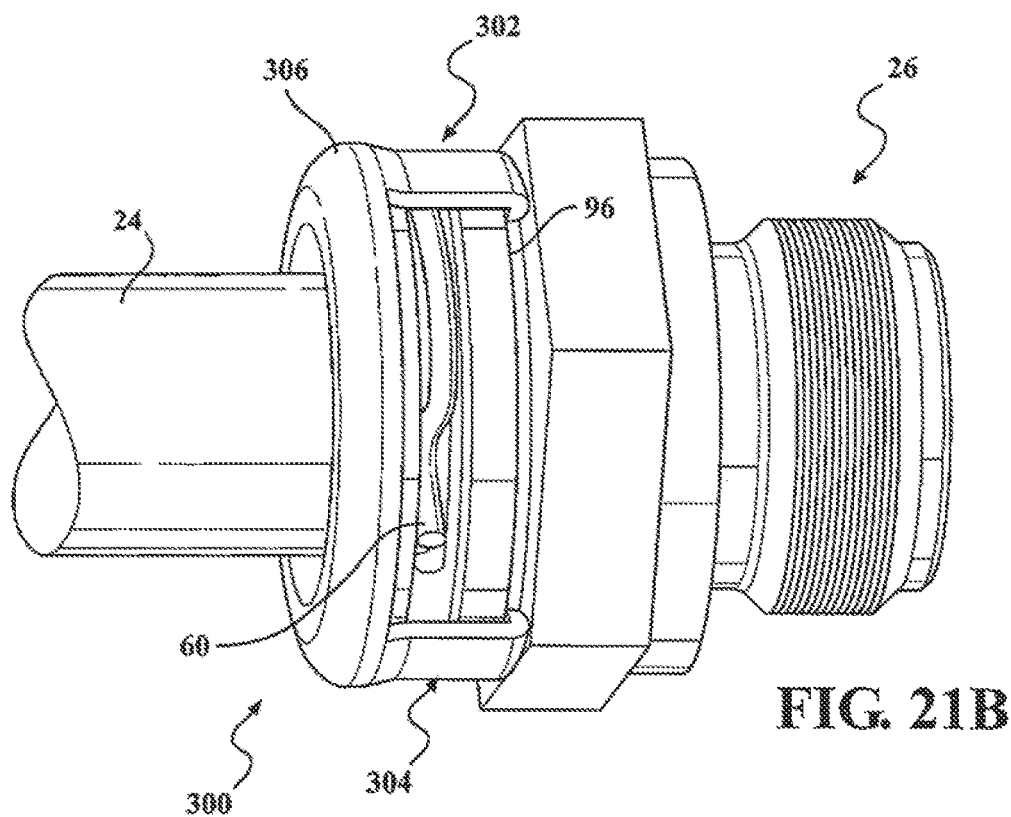
FIG. 21B is a perspective view of the assurance cap and quick connector body shown in FIG. 21A.

Referring now to FIGS. 21A and 21B, there is depicted another variation in the construction of assurance cap 300. In this aspect, assurance cap 300 is similar to assurance cap 70 described above and shown in FIGS. 2-8D except that assurance cap 300 has two small latch fingers 302 and 304 extending from intermediate annular portion 306. Fingers 302 and 304, which can be provided in any number, such as two, three, or more fingers, are configured more as standalone latch fingers rather than the closely separated fingers 82, 84, and 86 on assurance cap 70, which have a much longer circumferential extent.

Latch fingers 302 and 304 are constructed similarly to latch fingers 82, 84, and 86 in assurance cap 70 and are designed to snap into and latch in groove 98 on body 26 when tubular member 24 is fully inserted into body 26.

Fingers 302 and 304 are spaced apart about the circumference of assurance cap 300 in an angular orientation designed to intercept the raised portions of the resilient clip which would extend outward beyond the upper extent of insertion portion 56 of body 26 from groove 98 when tubular member 24 is not fully inserted in body 26. Thus, for example, in a two finger construction shown in FIGS. 21A and 21B, two fingers 302 and 304 are spaced less than 180° apart to one side of assurance cap 300 and greater than 180° apart on the other side of assurance cap 300.

As shown in FIG. 21B, fingers 302 and 304 are circumferentially spaced so that at least one of fingers 302 or 304 is in an interference position with retainer clip 60 so as to strike a raised portion of retainer clip 60 extending out of groove 58 in body 26 to prevent full movement of assurance cap 300 to the fully forward latched position. This assures that assurance cap 300 functions in its intended manner regardless of its angular orientation with respect to the protrusions and outer portions of retainer clip 60 in groove 58.

FIGS. 22-33 depict another aspect of assurance cap 600 mounted on fluid connector assembly 420. Assurance cap 600 is in the form of a one-piece body, which may be molded, machined or otherwise formed out of plastic, metal, such as aluminum, etc.

Assurance cap 600 is formed with first outer annular ring 602 at first end 603.

Support web 604 is formed interiorly of annular ring 602 and is joined integrally for example, to inner surface portions of annular ring 602 at circumferentially spaced locations to form a plurality of circumferentially spaced apertures 610, with four apertures 610 shown by way of example. It will be understood that more or less apertures 610 may be employed in annular cap 600. Support web 604 is disposed within annular ring 602 and carries keyhole shaped aperture 608 formed of first smaller diameter portion 612 and second large diameter portion 614.

Keyhole shaped aperture 608 allows assurance cap 600 to be inserted over or removed over tubular member 424 after endform or head portion 430 has been formed adjacent one end 422 of tubular member 424.

A notch is formed in support web 604 in a surface of support web 604 within primary latch fingers 620. The notch forms a stepped surface including arcuate first surface 609 generally parallel to the adjacent surface of support web 604 and perpendicular surface 611 extending between first surface 609 and the surface of support web 604.

A plurality of primary latch fingers 620 and a plurality of stepped fingers 622 are formed on a body of assurance cap 600 and are arranged in an annular, circumferential spaced, arrangement extending parallel to a longitudinal axis of assurance cap 600 from first annular ring 602 at first end 603 of assurance cap 600.

Primary latch fingers 620 and stepped fingers 622 are arranged in a generally alternating arrangement around the periphery of first end 603 of assurance cap 600. By example, primary latch fingers 620 and stepped fingers 622 may alternate in a circumferentially spaced side-by-side arrangement of one stepped finger 622 located between two primary latch fingers 620.

Primary latch fingers 620 include first and second legs 624 and 625 which are spaced apart and joined at one end by center end leg 626. Projection 630 is formed on the end of the outer end of center end leg 626 and has inner surface 632 with shoulder 634, the purpose of which will be described hereafter.

First and second side legs 624 and 625 have a tapered beam-like structure extending from a large width and/or thickness first end joined to support web 604 within one aperture 610. Each of first and second side legs 624 and 625 tapers to smaller width and/or thickness opposed end which joined by center end leg 626.

First and second legs 624 and 625 of each primary latch finger 620 are spaced apart to define interior aperture 627 extending between the first end of first and second legs 624 and 625 joined to support web 604 and an inner surface of center outer leg 626. Aperture 627 opens at one end to aperture 610.

Figure 22:
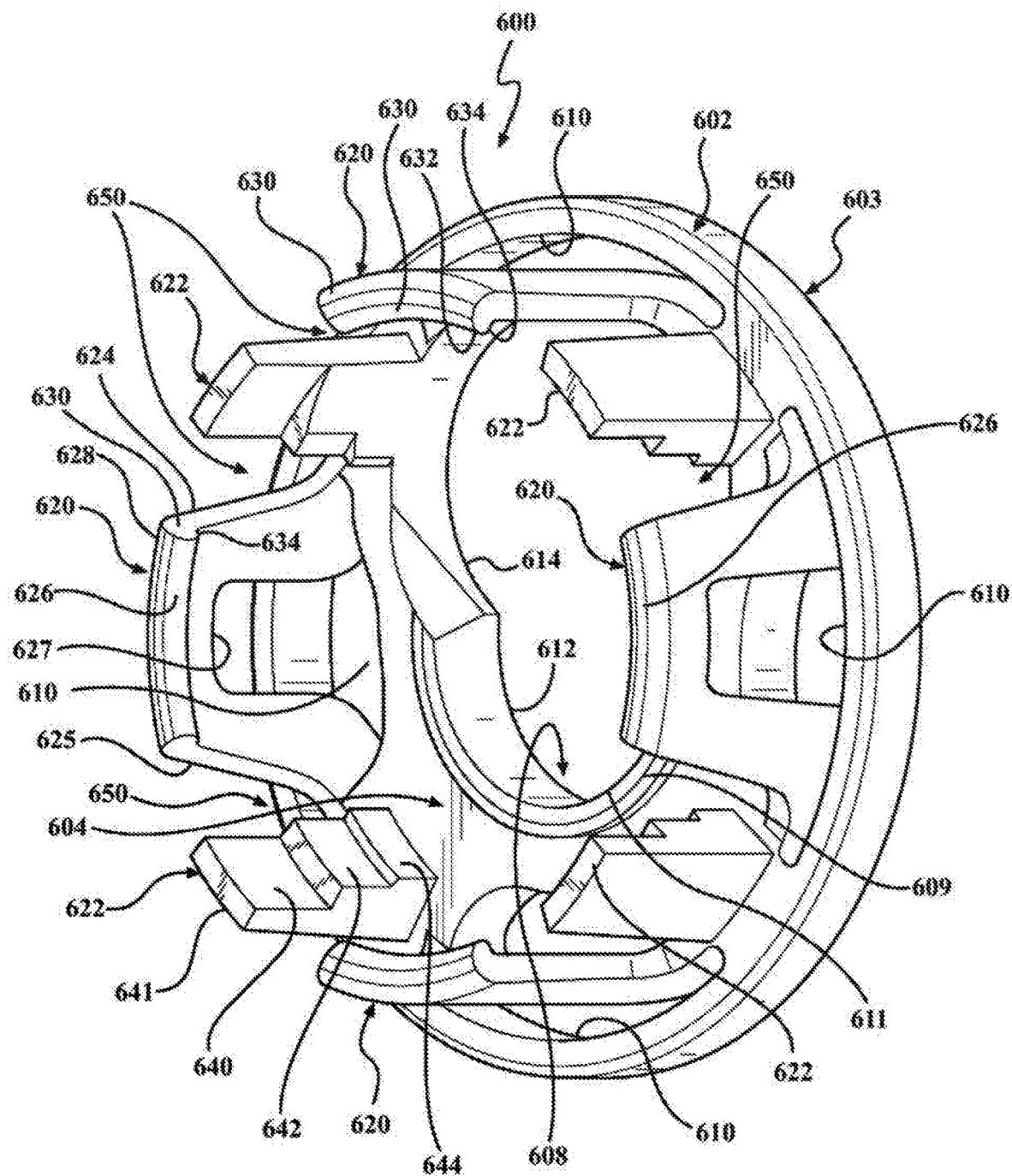
FIG. 22 is a left end perspective view of another aspect of an assurance cap.
Figure 23:
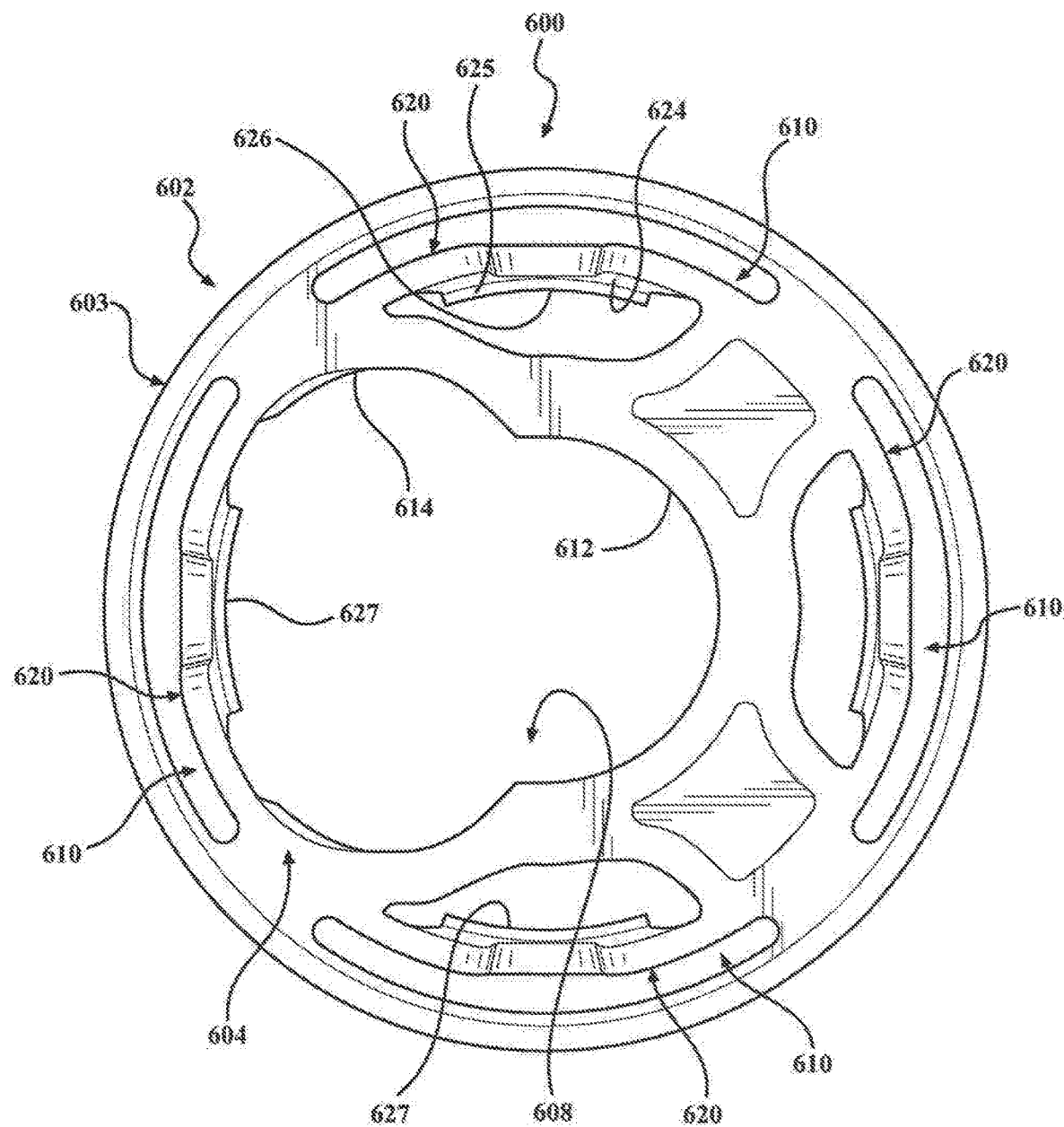
FIG. 23 is a right end elevational view of the assurance cap as shown in FIG. 22.
Figure 24:
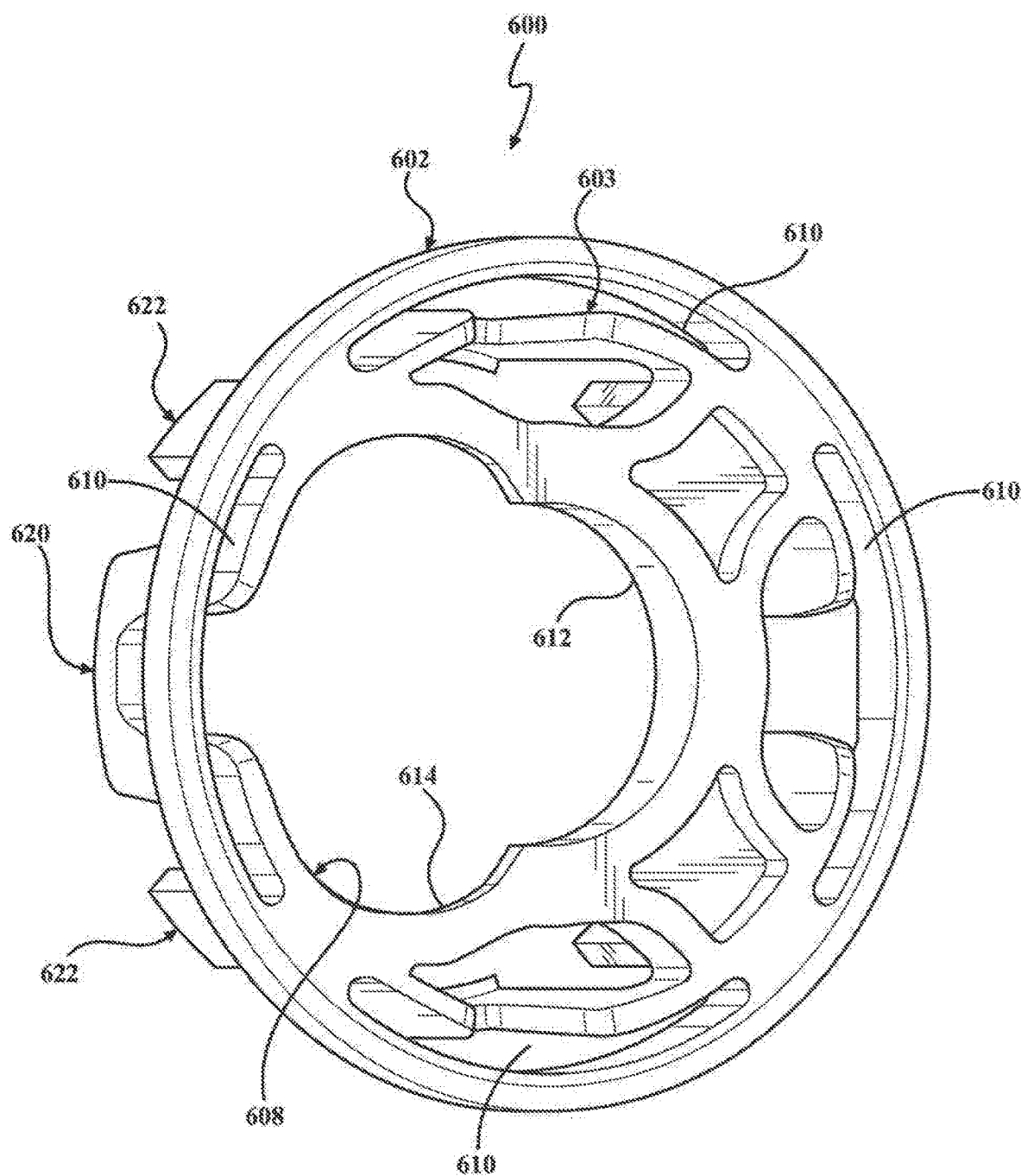
FIG. 24 is a right end perspective view of the assurance cap shown in FIGS. 22 and 23.
Figure 25:
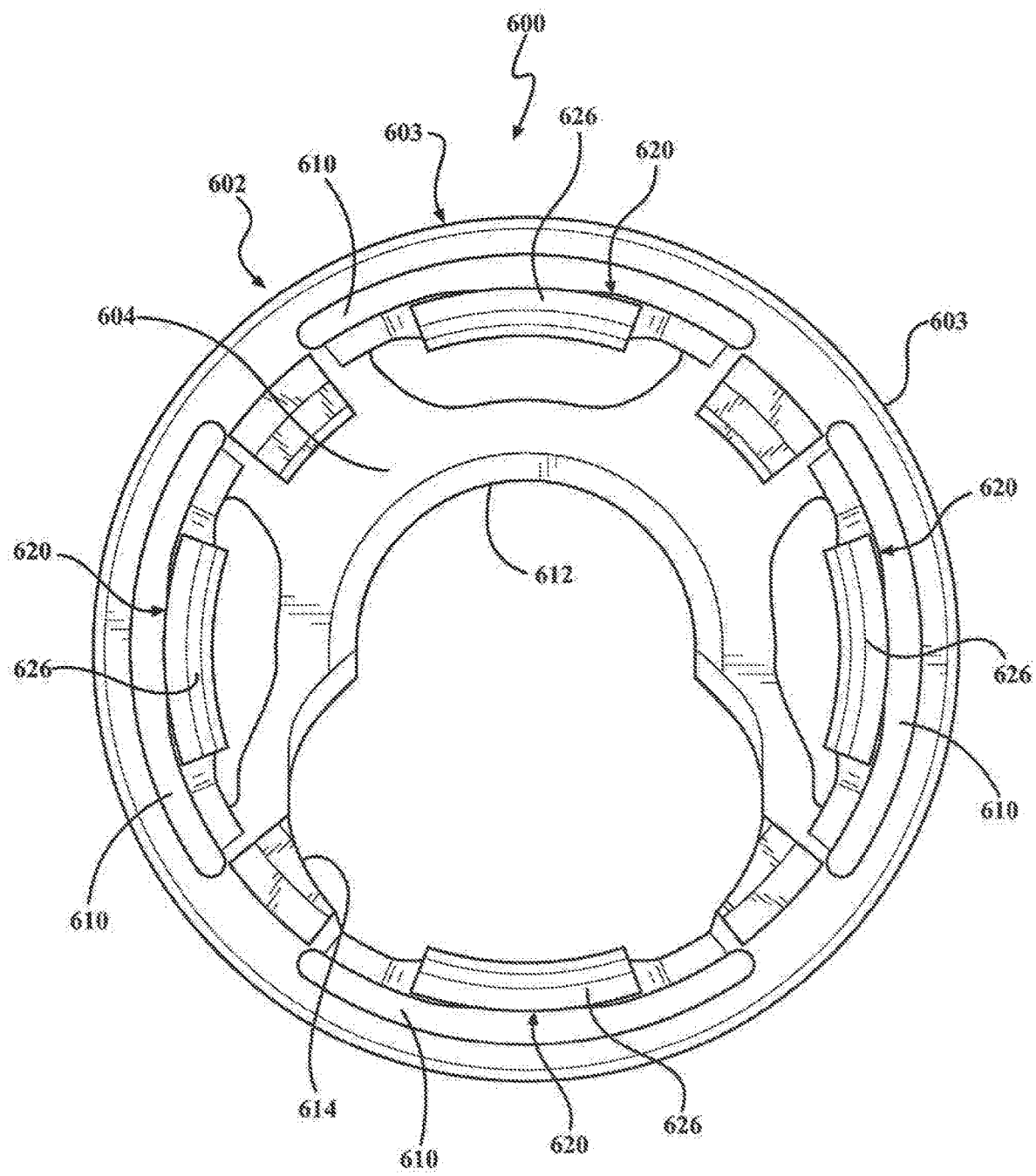
FIG. 25 is a left end elevational view of the assurance cap shown in FIGS. 22-24.
Figure 26:
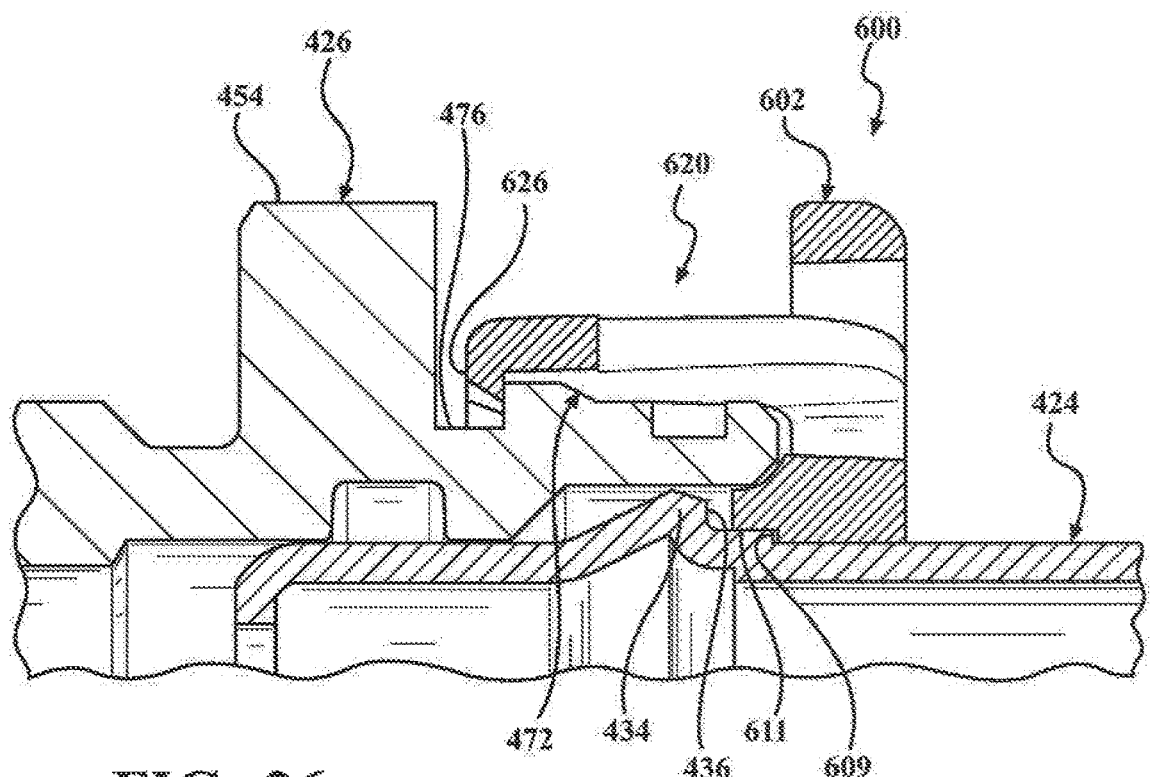
FIG. 26 is a longitudinal cross-sectional view showing the assurance cap depicted in FIGS. 22-25 in an assembled latched position with a fluid connector body and a tubular member extending into the connector body.

Further, the primary latch fingers are disposed within each aperture 610 in a position to divide each aperture 610, except for aperture 610 disposed at the open end of keyhole shaped aperture 608 as seen in FIGS. 22 and 23, into inner and outer aperture portions in which the outer aperture portions effectively lengthen primary latch fingers 620 that need to bend when assurance cap 600 is inserted into and latched in groove 476 in connector body 426 or separated from groove 476 as described hereafter. This lengthened bending arm reduces insertion efforts and separating the bending portion of primary latch fingers 620 from center end leg 626 carrying projection 630 which engages groove 476 in connector body 426.

Stepped fingers 622 have outmost first step 640 which terminates in outer end 641 contiguous with outer end 628 of each primary latch finger 620. Second step 642 is disposed axially adjacent first step 640 and has an inner surface disposed radially inward of the inner surface of first step 640. Third step 644 is disposed axially adjacent second step 642 and has an inner surface disposed radially inward of the inner surface of second step 642.

Primary latch fingers 620 and stepped fingers 622 are circumferentially spaced apart by slots 650 which open at first ends 628 and 641 of primary latch fingers 620 and stepped fingers 622, respectively. Slots 650 provide a degree of flexibility to primary latch fingers 620 and stepped fingers 622.

Referring to FIGS. 26-33, assurance cap 600 is first installed over tubular member 424 from either end of tubular member 424 prior to formation of endform 434 adjacent first end 422 of tubular member 424. Endform 434 slidably captures assurance cap 600 on tubular member 624.

Alternately, assurance cap 600 may be inserted over tubular member 424 from the end of tubular member 424 opposite first end 422 prior to the connection of the opposite end of tubular member 424 to another component. Endform 434, in this alternate installation, can be pre-formed on tubular member 424 prior to the mounting of assurance cap 600 from the opposite end of tubular member 424.

When tubular member 424 is to be coupled to quick connector body 426, first end 422 of tubular member 424 is inserted through open first end 444 of connector body 426. The ramp surface on the end of endform 434 of tubular member 424 will engage the radially inward extending protrusions on clip 460 and force the entire clip 460 radially outward until, when first end 422 of tubular member 424 is fully inserted into bore 440 in connector body 426, the protrusions on clip 460 snap radially inward to a relaxed normal state behind shoulder 436 on endform 434 on tubular member 424.

When tubular member 424 is locked to connector body 426 by clip 460, an installer can slide assurance cap 600 toward hexagonal portion 454 of quick connector body 426. Projections 630 on outer center end legs 626 of primary latch fingers 620 will engage ramp surface 472 on connector body 426 forcing center end legs 626 of primary latch fingers 620 radially outward. When assurance cap 600 is in the fully forward position, projections 630 snap into recess or groove 476 on connector body 426 latching assurance cap 600 to quick connector body 426. At the same time, as shown in FIG. 3B, second step 642 of each stepped finger 622 will be located circumferentially over the outer surface of clip 460. This arrangement holds clip 460 in its normal non-expanded state and prevents expansion of clip 460 due to any axial separation forces exerted on connector body 426 and/or tubular member 424 tending to disengage or separate connector body 426 and tubular member 424. Stepped fingers 622 thereby act as an axillary or secondary latch for assurance cap 600.

The arrangement of one stepped finger 622 between a pair of primary latch fingers 620 about the circumference of assurance cap 600 enables one or two or three stepped fingers 622 to be in contact with clip 460 at all annular positions of assurance cap 600 relative to quick connector body 426.

When projections 630 on primary latch fingers 620 are in the fully latched position in groove 476 on quick connector body 426, first surface 609 and second surface 611 of the notch in support web 604 will be in contacting engagement with shoulder 438 on raised bead or flange 437 on tubular member 422. This serves as secondary latch function securing assurance cap 600 to connector body 426 and tubular member 424 in the fully inserted position of tubular member 424 in connector body 426 between engaged projections 630 of primary latch fingers 620 in groove 476 and engaged inner end 608 of inner support ring 604 with flange 437 on tubular member 424.

Referring briefly to FIG. 8, a function of assurance cap 600 is to ensure that tubular member 424 is fully inserted into quick connector body 426 so that tubular member 424 can be latched in place by clip 460. During the insertion of tubular member 424 into bore 440 in quick connector body 426, the installer may feel resistance to forward insertion movement of tubular member 424 into bore 440 when, for example, first end 422 of tubular member 424 contacts O-ring 448 in the interior of quick connector body 426. This may give a false full insertion indication to the installer. However, assurance cap 600 is configured so that at all non-fully inserted positions of tubular member 424 relative to quick connector body 426, projections 630 on center end leg 626 of primary latch fingers 620 will not be fully latched in recess or groove 476 in connector body 426; but rather, will be in engagement with ramp surface 472 on radial outer surface 470 on the connector body as shown in FIG. 8. This prevents latching of primary latch fingers 620 to quick connector body 426. A non-fixed position of body 426 or a slight pull-out movement by the installer exerted on assurance cap 600 moving assurance cap 600 moving assurance cap 600 away from body 426 will provide an indication of non-latching of assurance cap 600 to quick connector body 426.

At the same time, assurance cap 600, due to web support structure 604 of primary latch fingers 620 and the number of such primary latch fingers 620 on the assurance cap, and the primary latching of projections 630 of primary latch fingers 620 in groove 476 of quick connector body 426, provides a force resisting axial separation of tubular member 424 from quick connector body 426 despite any axial separation forces acting on quick connector body 426 and tubular member 424.

Referring now to FIGS. 27-33, there is depicted disconnect tool 700 useful in disconnecting and allowing separation of assurance cap 400 or 600 from the last connection between assurance cap 400, 600 and connector body.

Disconnect tool 700 may be in the form of a one piece body having, for example, collar 702 which may have an annular ring-like shape. Discontinuity 704 is formed in the circumferential extent of collar 702 and opens to interior bore 706 in collar 702.

Collar 702 has opposed end surfaces 708 and 710 disposed on opposite sides of circumferential surface or edge 712 of collar 702. Outer circumferential surface 712 may be formed with a gripping surface such as knurls, to facilitate gripping of collar 702 during use of disconnect tool 700 as described hereafter.

Collar 702 may be formed of a suitable hard material, such as steel, brass, hard plastic or composite material.

Figure 27:
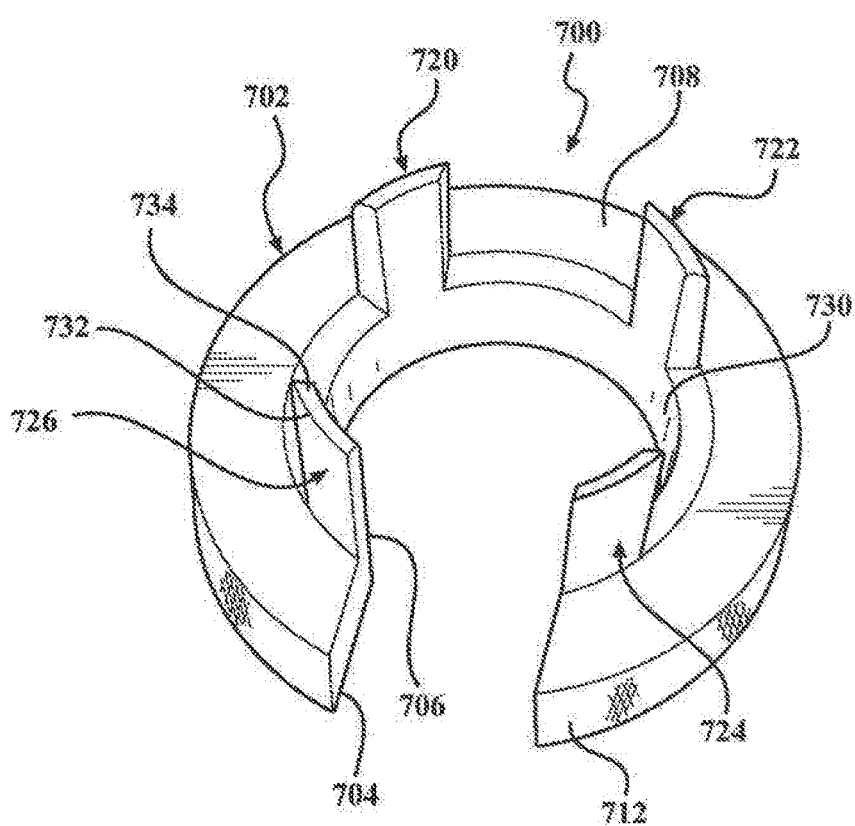
FIG. 27 is a perspective view of an assurance cap disconnect tool.

A plurality of assurance cap primary latch finger engagement members, each in the form of an axially extending finger, with four fingers 720, 722, 724, and 726 shown by example in FIG. 27 extend from one surface of collar 702. The number of fingers 720-726 are chosen to coincide with the number of primary latch fingers on assurance cap 400 or 600. In the example of assurance cap 600 shown in FIGS. 22-25, four primary latch fingers 620 are depicted by example. Thus, disconnect tool 700 is provided with four fingers 720-726, one finger for each primary latch finger 620. Fingers 720-726 are disposed in a circumferentially spaced arrangement at the same circumferential spacing as primary latch fingers 622 in assurance cap 600.

Fingers 720 extend in an axially direction from one surface, such as surface 708 of collar 702. Fingers 720-726 may be individual members fixed to or integrally formed as a part of collar 702 by adhesive, integral machining or molded as part of collar 702, etc.

By way of example only, fingers 720-726 are integrally formed as part of annular ring 730 which has substantially the same dimensions as the inner surface of collar 702 facing interior bore 706. Ring 730 may be secured to the interior surface of collar 702 by adhesive or other suitable means.

Discontinuity 704 in the circumferential extent of collar 702 serves as a mounting slot to enable collar 702 to be mounted on tubular member 424 of the fitting or fluid connection even after the large endform is formed in one end of tubular member 424.

The diameter of the inner surface of collar 702 and/or inner diameter of ring 730 is slightly larger than the outer diameter of the main axial extent of tubular member 424.

Each finger 720-726 has generally arcuate shaped cross-section, extending from one end, coupled to ring 730 or to collar 702 to outer end 732, as shown in FIG. 27 for finger 726. Outer end 732 may have tapered or ramp like surface 734 to facilitate disconnection of primary latch fingers 720 of assurance cap 600 from the groove in the connector body.

Figure 28:
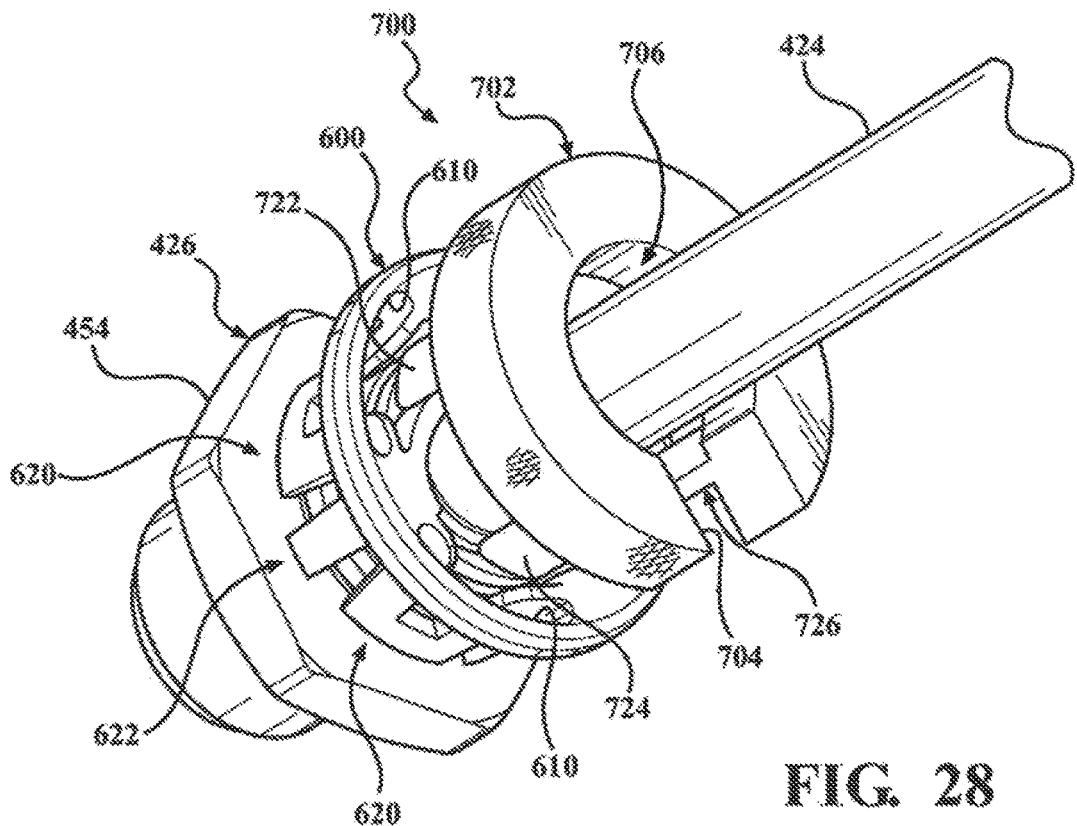
FIG. 28 is a perspective view showing the disconnect tool of FIG. 27 in an assembled, pre-engagement position relative to the assurance cap latched on the connector body.
Figure 29:
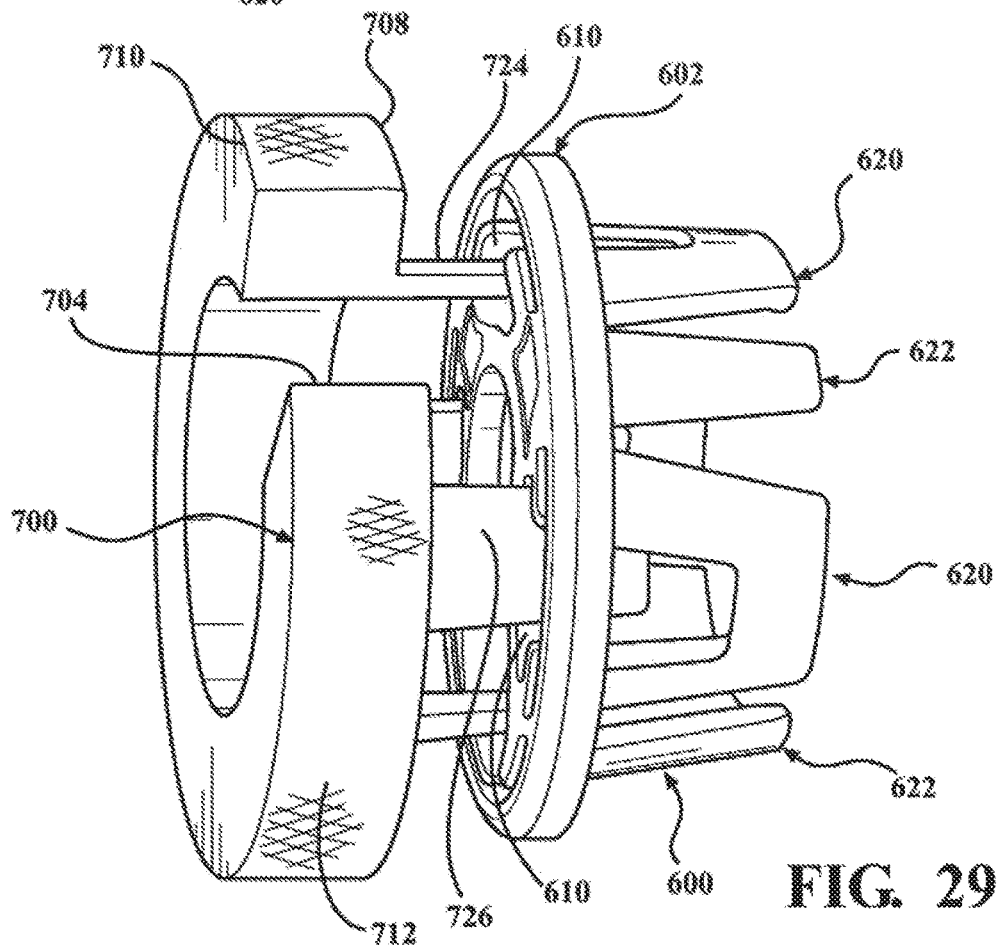
FIG. 29 is a side perspective view showing the disconnect tool of FIG. 27 in the assembled, pre-engagement position with assurance cap.
Figure 30:
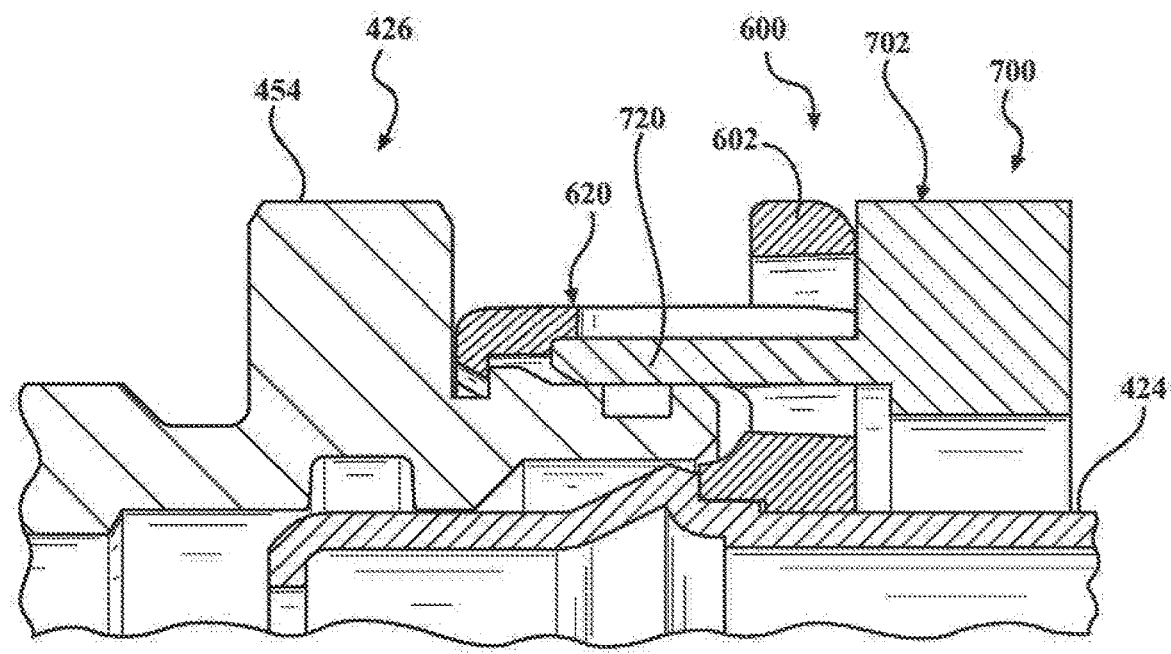
FIG. 30 is a longitudinal cross-sectional view showing the disconnect tool partially inserted into the assurance cap mounted on the connector body.
Figure 31:
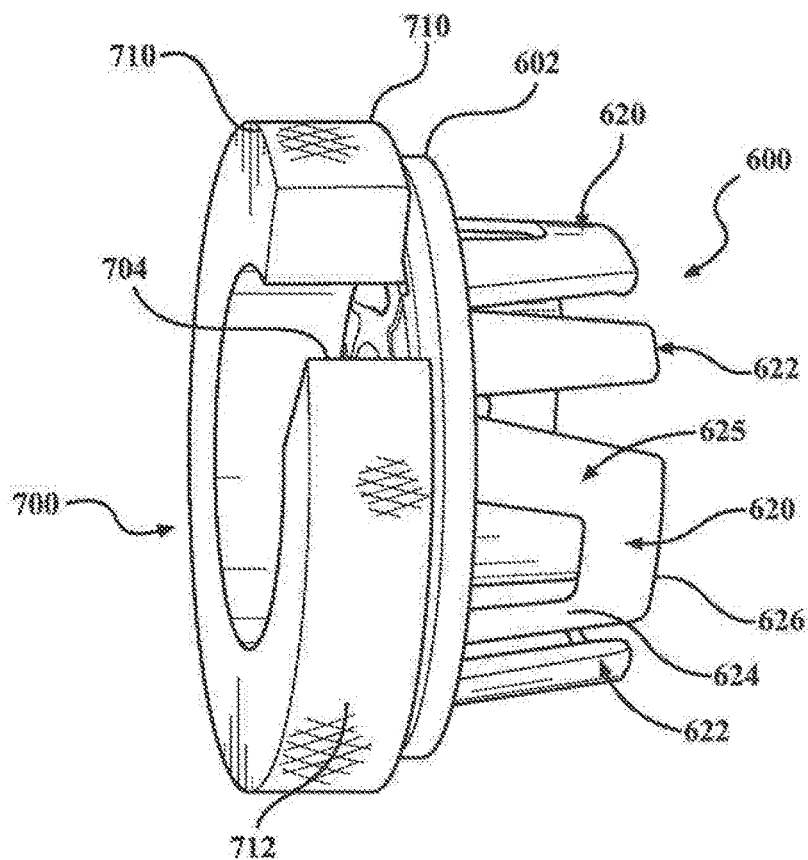
FIG. 31 is a side perspective view showing the disconnect tool in a fully engaged position with the assurance cap and the connector body.

In use, as shown in FIGS. 28 and 29, disconnect tool 700 is initially mounted over tubular member 424 by sliding slot 704 in collar 702 over the outer diameter of tubular member 424 adjacent the endform on tubular member 424 and assurance cap 600. Fingers 720-726 carried on collar 702 are arranged to face one end of assurance cap 600. Collar 702 is rotated about tubular member 424 until each of finger 720-726 is aligned with one of the inner slot portions of apertures 610 formed in one end of assurance cap 600 interiorly of support ring 604.

Collar 702 is then urged longitudinally along tubular member 424 to move fingers 720-726 through apertures 610 in assurance cap 600 toward connector body 426 as shown in FIGS. 29-32.

Figure 32:
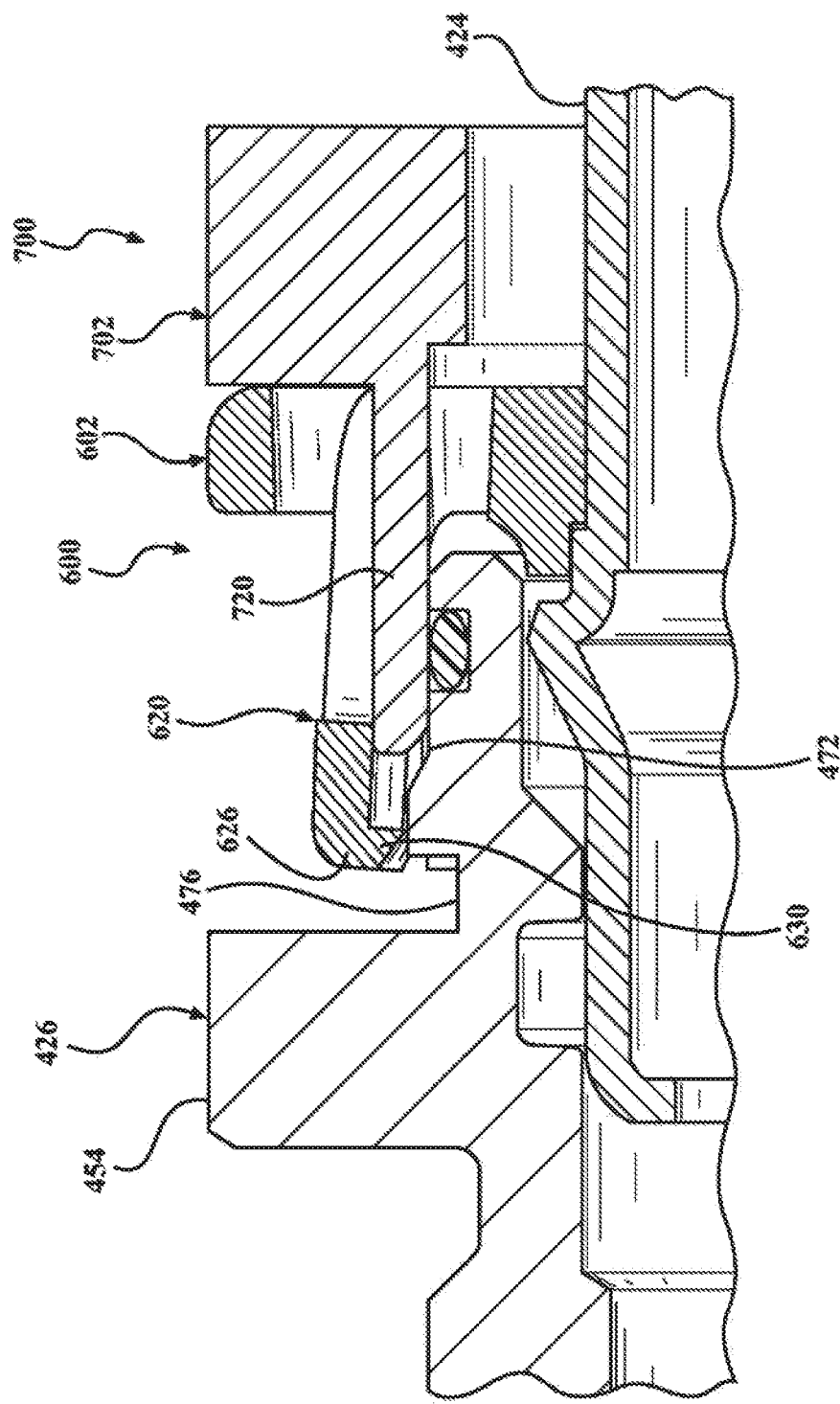
FIG. 32 is a longitudinal cross-sectional view and showing the engagement of the fingers on the disconnect tool with the primary latch fingers on the assurance cap, with the primary latch fingers shown in a disconnected, partially separated position relative to the connector body; and, FIG. 33 is a perspective cross-sectional view showing the disconnect tool and the assurance cap separated from the quick connect body and the endform on the tubular member.
Figure 33:
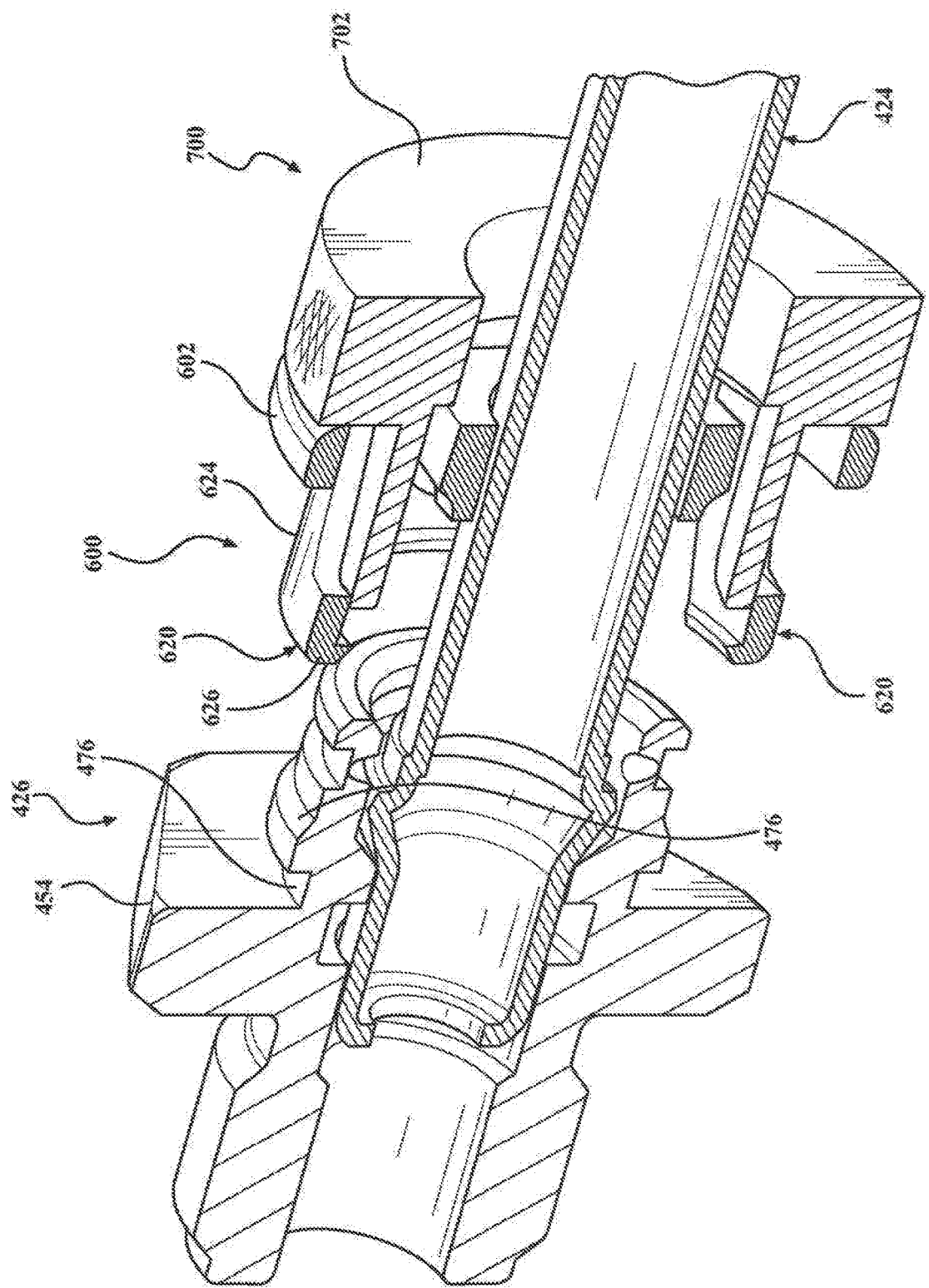

Ends 732 of fingers 720-724 engage ramp surface 472 on connector body 426 and bend or flex fingers 720-726 radially outward through engagement of tapered or ramp surface 734 carried on collar 702 with ramp surface 472 of connector body 426 as shown in FIG. 32. This radially outward movement pivots primary latch fingers 620 about support ring 602 and disengages projections 627 on the ends of primary latch fingers 620 from recess or groove 476 in connector body 426. When projections 627 are completely disengaged from groove 476, assurance cap 600 and disconnect tool 700 can be moved along tubular member 424 in a direction away from connector body 426, as shown in FIG. 33, to separate assurance cap 600 from connector body 426 without damage to assurance cap 600.

What is claimed is:

1. A fluid connector, comprising:
   a tubular member;
   a connector body, including:
      an exterior opening groove; and,
      a retainer clip to lock the tubular member to the connector body;
   an assurance cap including one or more latch fingers engaged with the exterior opening groove; and,
   a tool, including:
      an annular collar mountable over the tubular member; and,
      a plurality of fingers carried on and extending axially from the annular collar, the plurality of fingers operatively arranged to engage the latch fingers when the collar and the plurality of fingers are engaged with the assurance cap to disengage the latch fingers from the exterior opening groove to disconnect the assurance cap from the connector body.

2. The fluid connector as recited in claim 1, wherein the annular collar comprises an outer circumferential edge including a grip surface.

3. The fluid connector as recited in claim 1, wherein each of the plurality of fingers comprises an end operatively arranged to engage a ramp surface on the connector body when the collar and the plurality of fingers are urged into engagement with the connector body through the assurance cap to flex the latch fingers outward relative to the connector body.

4. The fluid connector as recited in claim 3, wherein the end of each of the plurality of fingers comprises a ramp edge.

5. The fluid connector as recited in claim 1, wherein the number of the plurality of fingers is equal to the number of latch fingers.

6. The fluid connector as recited in claim 1, wherein:
the annular collar comprises a first end surface and a second end surface; and,
the plurality of fingers are circumferentially spaced along the second end surface.

7. A fluid connector assembly, comprising:
a tubular member;
a connector body, including:
an exterior opening groove; and,
a retainer clip to lock the tubular member to the connector body;
an assurance cap including one or more latch fingers engaged with the exterior opening groove; and,
a tool, including:
an annular collar mountable over the tubular member, the annular collar comprising:
a first end surface; and,
a second end surface; and,
a plurality of fingers extending from the second end surface.

8. The fluid connector assembly as recited in claim 7, wherein the plurality of fingers are circumferentially spaced along the second end surface.

9. The fluid connector assembly as recited in claim 7, wherein the plurality of fingers are arranged to engage a radially inward facing surface of the one or more latch fingers.

10. The fluid connector assembly as recited in claim 7, wherein the plurality of fingers are arranged to engage the assurance cap radially between the one or more latch fingers and the connector body to disengage the assurance cap from the connector body.

11. The fluid connector assembly as recited in claim 7, wherein the connector body further comprises a ramp surface.

12. The fluid connector assembly as recited in claim 11, wherein the plurality of fingers are arranged to engage the ramp surface when the collar and the plurality of fingers are urged into engagement with the connector body through the assurance cap to flex the latch fingers outward relative to the connector body.

13. The fluid connector assembly as recited in claim 7, wherein the end of each of the plurality of fingers comprises a ramp edge.

14. The fluid connector assembly as recited in claim 7, wherein the annular collar further comprises an outer circumferential surface including a grip surface.

15. The fluid connector assembly as recited in claim 7, wherein the annular collar further comprises a discontinuity.

16. A fluid connector assembly, comprising:
a connector body, including an exterior opening groove;
a tubular member operatively arranged to be connected to the connector body;
an assurance cap including one or more latch fingers engaged with the exterior opening groove when the tubular member is connected to the connector body; and,
a tool including a plurality of fingers operatively arranged to engage the one or more latch fingers to disengage the one or more latch fingers from the exterior opening.

17. The fluid connector assembly as recited in claim 16, wherein the tool further comprises
an annular collar mountable over the tubular member, the annular collar comprising:
a first end surface; and,
a second end surface, wherein the plurality of fingers extend from the second end surface.

18. The fluid connector assembly as recited in claim 17, wherein:
the annular collar further comprises a radially outward facing surface and a radially inward facing surface; and,
the tool further comprises an annular ring connected to the radially inward facing surface, wherein the plurality of fingers extend axially from the annular ring.

19. The fluid connector as recited in claim 17, wherein the plurality of fingers are circumferentially spaced along the second end surface.

20. The fluid connector assembly as recited in claim 16, wherein the annular collar comprises a radially inward facing surface, and the plurality of fingers are arranged adjacent to the radially inward facing surface.

* * * * *